(12) United States Patent
Wang

(10) Patent No.: US 11,945,374 B1
(45) Date of Patent: Apr. 2, 2024

(54) STEERING-WHEEL COMPUTER BRACKET

(71) Applicant: Hao Wang, Beijing (CN)

(72) Inventor: Hao Wang, Beijing (CN)

( * ) Notice: Subject to any disclaimer, the term of this patent is extended or adjusted under 35 U.S.C. 154(b) by 0 days.

(21) Appl. No.: 18/451,268

(22) Filed: Aug. 17, 2023

(30) Foreign Application Priority Data

Oct. 20, 2022 (CN) .......................... 202222767703.X

(51) Int. Cl.
 *B60R 11/02* (2006.01)
 *B60R 11/00* (2006.01)

(52) U.S. Cl.
 CPC ..... *B60R 11/0252* (2013.01); *B60R 2011/001* (2013.01); *B60R 2011/005* (2013.01); *B60R 2011/0082* (2013.01); *B60R 2011/0084* (2013.01); *B60R 2011/0087* (2013.01)

(58) Field of Classification Search
 CPC ....... B60R 2011/001; B60R 2011/0082; B60R 2011/0252
 USPC .......................................... 224/276; 248/462
 See application file for complete search history.

(56) References Cited

U.S. PATENT DOCUMENTS

| | | | | |
|---|---|---|---|---|
| 1,840,620 A * | 1/1932 | Dennis | ................. | A47B 23/043 248/462 |
| 5,542,314 A * | 8/1996 | Sullivan | .............. | B60R 11/0252 224/276 |
| 6,648,193 B2 * | 11/2003 | Rioux | ....................... | B60R 7/04 224/276 |
| 7,216,789 B2 * | 5/2007 | Caradimos | .......... | B60R 11/0264 224/276 |
| 7,712,719 B2 * | 5/2010 | Derry | ..................... | F16M 11/26 248/346.06 |
| 8,550,421 B2 * | 10/2013 | Liu | ........................ | F16M 11/10 248/463 |
| 8,608,037 B2 * | 12/2013 | Stroh | ...................... | B60R 11/00 224/276 |
| 8,783,641 B2 * | 7/2014 | Lin | ........................ | F16M 11/10 248/463 |
| 9,731,656 B1 * | 8/2017 | States | ..................... | B60R 11/00 |
| D838,724 S * | 1/2019 | Olander | ............... | F16M 11/041 D14/447 |
| D898,748 S * | 10/2020 | Ma | ............................. | D14/447 |
| D902,936 S * | 11/2020 | Hong | .......................... | D14/447 |
| D904,416 S * | 12/2020 | Xu | ............................. | D14/447 |
| D937,279 S * | 11/2021 | Zhang | ........................ | D14/447 |
| D938,958 S * | 12/2021 | Zhang | ........................ | D14/447 |
| D950,569 S * | 5/2022 | Xiong | ........................ | D14/447 |
| D968,415 S * | 11/2022 | Chen | .......................... | D14/447 |
| 11,523,684 B1 * | 12/2022 | Huang | ................. | A47B 23/043 |
| 11,583,076 B2 * | 2/2023 | Kinney | .................. | A47B 96/07 |
| D991,265 S * | 7/2023 | Wang | .......................... | D14/447 |

(Continued)

*Primary Examiner* — Justin M Larson

(57) ABSTRACT

A steering-wheel computer bracket includes two foldable support assemblies. Each foldable support assembly comprises a fixed portion, a movable portion, and a support element. An end of the movable portion is hinged to a side of the fixed portion and can be flipped to have an angle with respect to or to attach to the side of the fixed portion, the other side of the fixed portion serves as a mounting surface; an end of the support element is rotatably connected to the other end of the movable portion, the support element is capable of being flipped, along with the movable portion being flipped, to attach to a side of the fixed portion or to have an angle relative to the side of the fixed portion.

20 Claims, 16 Drawing Sheets

(56) References Cited

U.S. PATENT DOCUMENTS

| | | | |
|---|---|---|---|
| 11,690,445 B2* | 7/2023 | Olander | A47B 23/043 248/163.1 |
| 11,794,654 B2* | 10/2023 | Ozawa | B60R 1/12 |
| 2018/0252353 A1* | 9/2018 | Hou | F16M 13/00 |
| 2022/0250554 A1* | 8/2022 | Skelton | B60R 11/0241 |
| 2022/0322823 A1* | 10/2022 | Zhou | G06F 1/1632 |

* cited by examiner

STEERING-WHEEL COMPUTER BRACKET

CROSS REFERENCE TO RELATED APPLICATIONS

The present application claims the priority of Chinese patent application No. 202222767703.X, filed on Oct. 20, 2022, and contents of which are incorporated herein by its entireties.

TECHNICAL FIELD

The present disclosure relates to the field of office supplies, and in particular to a steering-wheel computer bracket.

BACKGROUND

Many mobile officing staff may temporarily use a laptop computer while a car is parked. Various in-car computer desks are available in the market. An important category of the in-car computer desks is a computer desk or bracket that is mounted on a steering wheel. The steering wheel is the only component of the car that is ergonomically designed in order to satisfy the demand of performing operations by both hands on a front side of a human body. Therefore, when the laptop computer is placed on the steering wheel, a user may type words or work most comfortably.

SUMMARY OF THE DISCLOSURE

A steering-wheel computer bracket includes two foldable support assemblies, wherein each foldable support assembly comprises a fixed portion, a movable portion, and a support element. An end of the movable portion is hinged to a side of the fixed portion and is capable of being flipped to have an angle with respect to or to attach to the side of the fixed portion, the other side of the fixed portion serves as a mounting surface; an end of the support element is rotatably connected to the other end of the movable portion, the support element is capable of being flipped, along with the movable portion being flipped, to attach to a side of the fixed portion or to have an angle relative to the side of the fixed portion. Alternatively, the support element is strip-shaped, the movable portion is rotatably arranged on a side of the fixed portion; the other side of the fixed portion serves as a mounting surface, an end of the support element is hinged to the movable portion. When the computer bracket is hung to a steering wheel, two support elements of the two foldable support assemblies are unfolded and respectively hung to two sides of an upper edge of the steering wheel; and when the computer bracket is placed on a desktop, the support element is selectively unfolded, the support element is folded or unfolded to adjust an inclination of a laptop computer.

According to the present disclosure, the steering-wheel computer bracket has a reasonable structural design and may be flexibly and conveniently used. The computer bracket on the steering wheel in the present disclosure may be easily folded and stored, and may be used, for office working, on the steering wheel in a car and on a desktop office.

Figure 1:
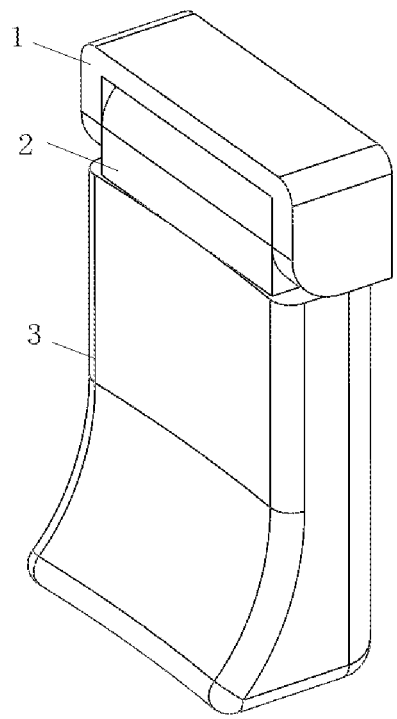
FIG. 1 is a structural schematic view of a foldable support assembly in a steering-wheel computer bracket according to an embodiment of the present disclosure.

REFERENCE NUMERALS IN THE DRAWINGS 10, foldable support assembly; 1, fixed portion; 2, movable portion; 3, support element; 31, hook portion; 32, support plate; 4, bracket assembly; 41, support base plate; 41a, storage slot; 42, limiting portion; 43, first abutting region; 44, second abutting plane; 45, support rod set; 46, folding frame; 411, extension-retraction support rod; 412, extension-retraction connecting rod; 413, support rod; 421, first support base plate; 422, first support panel; 423, first shear-typed extension-retraction frame; 424, first support member; 425, first support portion; 431, base plate support; 432, panel support; 433, protrusion; 434, support board; 441, support sub-plate; 442, connecting rod; 443, computer support block; 451, second support base plate 452, second support panel; 453, second shear-typed extension-retraction frame; 454, second support member; 455, curved portoin; 456, second support portion.

DETAILED DESCRIPTION

Principles and features of the present disclosure are described below by referring to the accompanying drawings, and given examples are for purposes of explaining only and are not intended to limit the scope of the present disclosure.

Embodiments

As shown in FIG. 1 to FIG. 22, a steering-wheel computer bracket of the present embodiment includes a bracket assembly 4 and two foldable support assemblies. Each of the two foldable support assemblies includes a fixed portion 1, a movable portion 2, and a support element 3. An end of the movable portion 2 is hinged to a side of the fixed portion 1. The movable portion 2 may be rotated to reach a position having an angle with respect to the side of the fixed portion 1 or to attach to the side of the fixed portion 1. The other side of the fixed portion 1 serves as a mounting surface. An end of the support element 3 is rotationally connected to the other end of the movable portion 2. The support element 3 may be rotated, along with rotation of the movable portion 2, to reach a position having an angle with respect to the side of the fixed portion 1 or to attach to the side of the fixed portion 1. Two fixed portions 1 of the two foldable support assemblies are respectively mounted on two sides of one end of the bracket assembly 4 (specifically: the "two sides of one end" represents a direction. The term indicates that the two foldable support assemblies are disposed at two sides of one end of the bracket assembly 4. A distance between the two foldable support assemblies is smaller than a diameter of the steering wheel). For each of the two foldable support assemblies, the support member 3 may be flipped to be folded on the side of the bracket assembly 4 or flipped to be unfolded away from the bracket assembly 4 and to support the side of the bracket assembly 4.

In some embodiments, the fixed portion 1 of each of the two foldable support assemblies 10 and the bracket assembly 4 are configured as a one-piece and integral structure. In this way, the movable portion 2 of each of the two foldable support assemblies 10 may be directly connected to the bracket assembly 44, and the fixed portion 1 may be omitted. Therefore, an overall structure and appearance of the steering-wheel computer bracket is simplified.

More specifically, the foldable support assembly may have following two structures.

Figure 2:
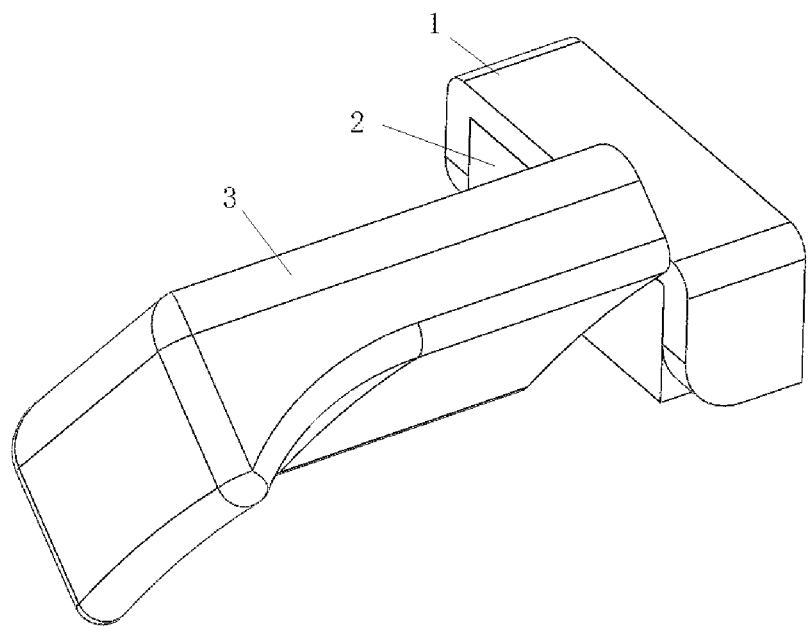
FIG. 2 is the foldable support assembly shown in FIG. 1 in an in-use state.

1) As shown in FIG. 1 and FIG. 2, the foldable support assembly includes the fixed portion 1, the movable portion 2, and the support element 3. The end of the movable portion 2 is hinged to the side of the fixed portion 1. The movable portion 2 may be rotated to reach the position having an angle with respect to the side of the fixed portion 1 or to attach to the side of the fixed portion 1. The other side of the fixed portion 1 serves as the mounting surface. The end of the support element 3 is rotationally connected to the other end of the movable portion 2. The support element 3 may be rotated, along with rotation of the movable portion 2, to reach the position having an angle with respect to the side of the fixed portion 1 or to attach to the side of the fixed portion 1.

Figure 3:
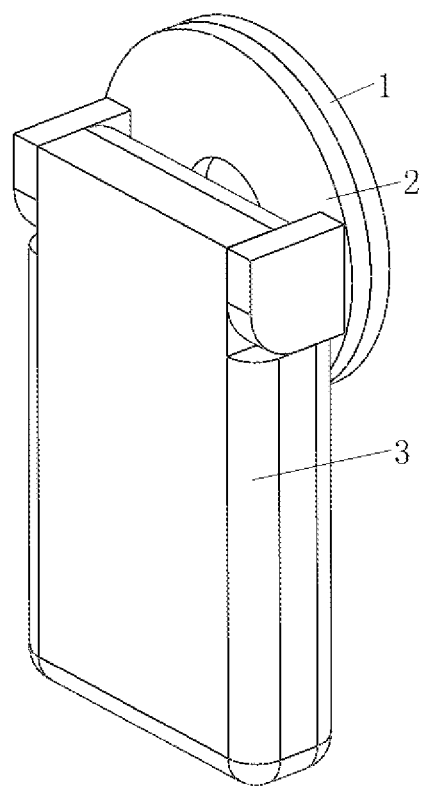
FIG. 3 is a structural schematic view of a foldable support assembly in a steering-wheel computer bracket according to another embodiment of the present disclosure.
Figure 4:
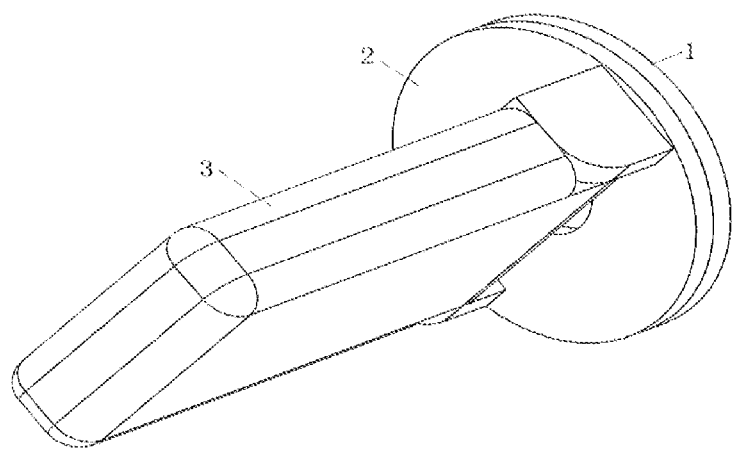
FIG. 4 is the foldable support assembly shown in FIG. 3 in an in-use state.

2) As shown in FIG. 3 and FIG. 4, the foldable support assembly includes the fixed portion 1, the movable portion 2, and a strip-shaped support element 3. The movable portion 2 is rotationally mounted to the side of the fixed portion 1. The other side of the fixed portion 1 serves as the mounting surface. The end of the support element 3 is hinged to the movable portion 2. When the support element 3 is flipped to be unfolded relative to the fixed portion 1, a side of the support element 3 near the bracket assembly 4 serves as a support surface to attach to an outer edge of an upper of the steering wheel.

Figure 5:
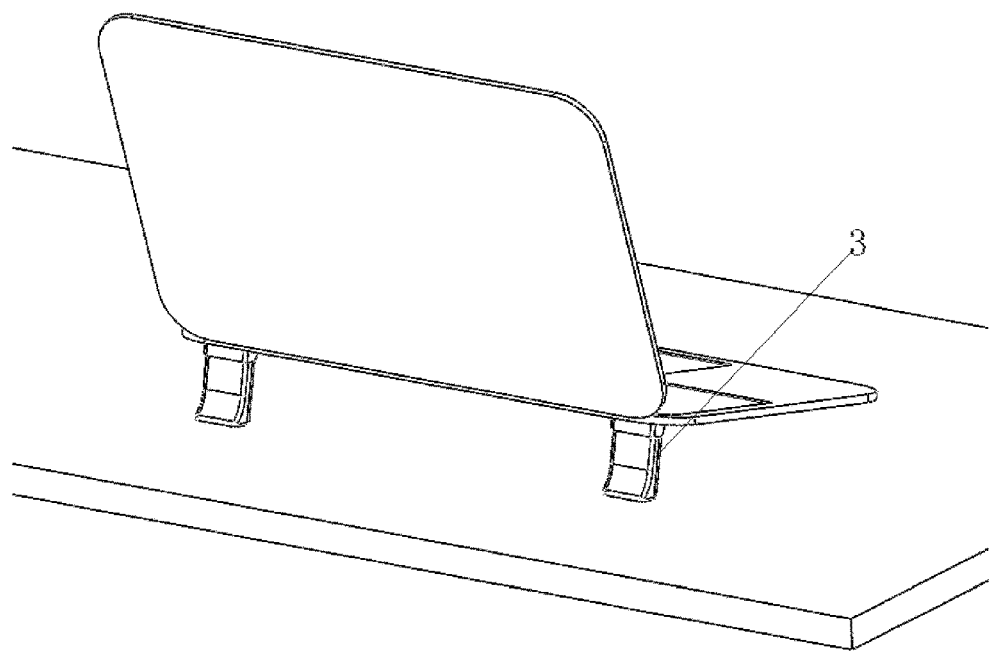
FIG. 5 is a structural schematic view 1 of the foldable support assembly in the steering-wheel computer bracket being separately configured on a laptop computer according to an embodiment of the present disclosure.
Figure 6:
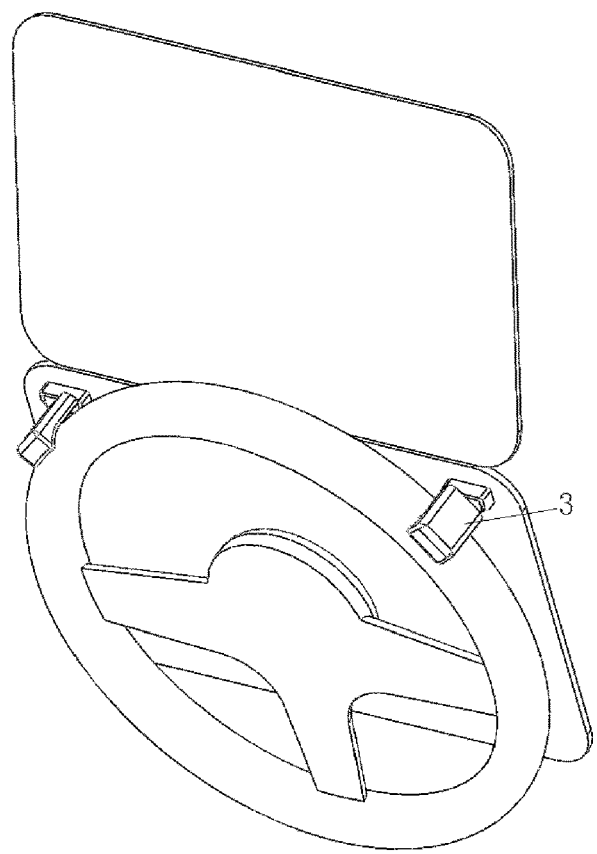
FIG. 6 is a structural schematic view 2 of the foldable support assembly in the steering-wheel computer bracket being separately configured on a laptop computer according to an embodiment of the present disclosure.

In the present embodiment, the foldable support assemblies having the structures shown in 1) and 2) may be used independently. Specifically, as shown in FIG. 1 to FIG. 7, the mounting surface (i.e., the other side) of the fixed portion 1 may be directly mounted on (by adhesives) a rear of a laptop computer, such that the laptop computer may be placed on a desktop (as shown in FIG. 5, two support elements 3 are spaced apart from each other and are arranged on the rear of the laptop computer). Alternatively, after the mounting surface of the fixed portion 1 are fixed to the rear of the laptop computer, the two support elements 3 may be unfolded and respectively attached to two sides of the upper edge of the steering wheel. In this way, the rear of the laptop computer may be attached to the upper of the steering wheel (as shown in FIG. 6, the two support elements 3 are spaced apart from each other and are arranged on the rear of the laptop computer). The hinged connection in the above two types of structures is configured to achieve folding and unfolding. The rotational connection is configured to achieve the following. When the support elements 3 hangs to the steering wheel, the support elements 3 may be rotated passively, the support surface is naturally tangent to the outer edge of the steering wheel to increase contact area, such that a pressure is reduced, the structure of the support element is more solid and stable than that of the hook in the art, and the support elements may be adapted to various sizes of steering wheels.

One of connection between the movable portion 2 and the fixed portion 1 of the foldable support assembly 10 and connection between the support element 3 and the movable portion 2 of the foldable support assembly 10 is hinged connection, and the other one of the connection between the movable portion 2 and the fixed portion 1 and the connection between the support element 3 and the movable portion 2 is rotational connection. In this way, the support element 3 as a whole may be folded and rotated relative to the fixed portion 2. Therefore, the support element 3 of the foldable support assembly 10 may be rotatably adjusted in the horizontal direction and in the vertical direction, the entire foldable support assembly 10 may be rotated highly flexibly. In some embodiments, when the laptop computer is placed on the desktop, a bottom of the support element 3 extends along a plane on which the desktop is arranged, enabling the support element 3 to contact a line or a face of the desktop. The bottom of the support element 3 extends along the plane on which the desktop is arranged, and that is, a bottom wall of the support element 3 is a non-spherical structure. Therefore, when the laptop computer is placed on the desktop via the two foldable support assemblies 10, and the bottom of the support element 3 (a free end) contacts the desktop by a line or a face. Compared to a point contact, the contact between the bottom of the support element 3 and the desktop has larger area. Bottom surfaces of the two support elements 3 may be adjusted to be placed on the desktop in a flat manner, such that the entire foldable support assemblies 10 may be supported by the desktop more stably and reliably and may be less likely to fall over.

In the present embodiment, based on the above structures 1) and 2), the structure of the support element 3 further includes at least the following manners.

For a manner I, as shown in FIG. 3 and FIG. 4, the support surface is a flat surface. When the support element 3 is flipped to be unfolded relative to the fixed portion 1, an angle between the support surface and the bracket assembly 4 is not greater than 90° (that is, the maximum angle between the support element 3 and the bracket assembly 4 is not greater than 90°). In this way, it is ensured that, after the support element 3 is unfolded relative to the fixed portion 1, the support element 3 may be hung to the upper edge of the steering wheel.

Specifically, in an example, the support element 3 is a strip-shaped plate structure. Two surfaces at two sides of the support element 3 are parallel to each other and are flat surfaces. After the support element 3 is unfolded relative to the fixed portion 1, the angle between the support surface and the bracket assembly 4 is not greater than 90°.

Figure 7:
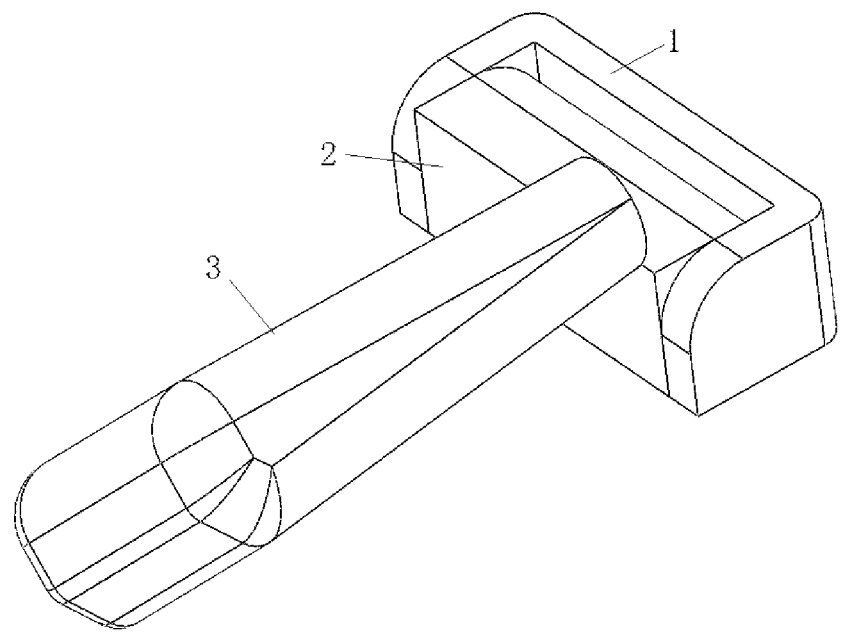
FIG. 7 is a structural schematic view of a foldable support assembly in a steering-wheel computer bracket according to still another embodiment of the present disclosure.

For a manner II, as shown in FIG. 7, the support surface is a flat surface. Further, after the support element 3 is unfolded relative to the fixed portion 1, the angle between the support surface and the bracket assembly 4 is less than 90° (that is, after the support element 3 is unfolded relative to the fixed portion 1, the angle between the support surface and the bracket assembly 4 is less than 90°, and the support surface is inclined), and the support element 3 may be stably fastened to the upper edge of the steering wheel.

For a manner III, as shown in FIGS. 1, 2, 5, 6, 9, 10, 17, 18, 21, and 22, the support surface is a curved surface adapted to the outer edge of the steering wheel. The adaptation in the present embodiment refers to the following. 1) The support surface is located at an outside of the steering wheel, and a shape or a contour of the support surface may be similar to or a shape or a contour of the outer edge of the steering wheel. 2). The support surface or the support element 3 itself is a curved hook. While in use, the curved hook may be hooked or hung on the outer edge of the steering wheel. Since the support surface is inversely fastened to the outer edge of the steering wheel after the support element 3 is flipped to be unfolded, and since the support surface is curved (the support surface is recessed), the support surface may be stably and inversely hung to the upper edge of the steering wheel.

More specifically, a structure of the support surface being curved includes at least two structural forms in the following.

(1) As shown in FIGS. 1, 2, 5, 6, 9, 10, 21, and 22, the support element 3 is the strip-shaped plate structure. A side of the support element 3 is a flat surface, and the other side of the support element 3 is a curved surface. Further, a thickness of an end of the support element 3 away from the movable portion 2 is greater than a thickness of an end of the support element 3 near the movable portion 2. In this structural form, the support element 3 may be applied to an embodiment of the computer bracket being hung to the steering wheel. Specifically, the inclined surface is attached to the upper edge of the steering wheel. Due to the curved surface, the curved surface may be tightly fastened to an inner side of the upper edge of the steering wheel (a side away from the driver), such that structural engagement similar to hooks may be formed, allowing the computer bracket to be stably hung and may not be easily detached from the steering wheel.

Figure 17:
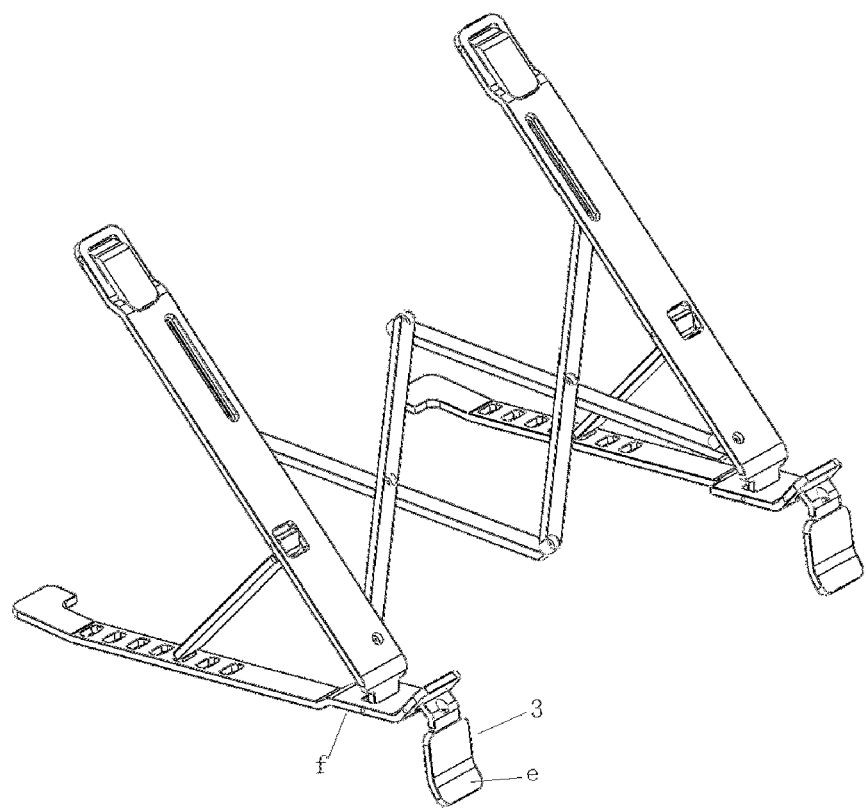
FIG. 17 are structural schematic views of steering-wheel computer brackets according to other embodiments of the present disclosure.
Figure 18:
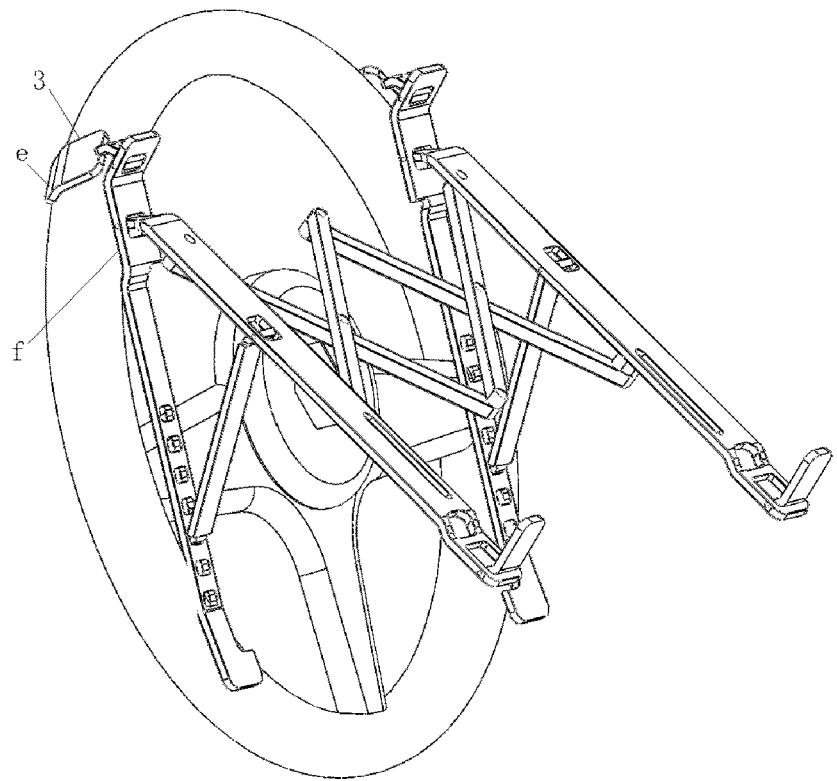
FIG. 18 is a structural schematic view of the steering-wheel computer bracket according to still another embodiment of the present disclosure.

(2) As shown in FIG. 17 and FIG. 18, an end of the support element 3 away from the movable portion 2 is bent towards a side of the support element 3 to form a curved hook portion (indicated by e in the drawings). A surface of the hook portion and a surface of the remaining part of the support element 3 cooperatively serve as the support surface. In this structural form, the support element 3 may be applied to an embodiment of the computer bracket being hung to the steering wheel. Specifically, while in use, after the supporting element 3 is unfolded, the side of the support element 3 is attached to the upper edge of the steering wheel. Due to the hook portion, the curved portion may operate cooperatively with the entire bracket to be hooked to the inner side of the upper edge of the steering wheel (the hook portion is disposed at the upper edge of the steering wheel, at the side away from the driver), such that structural engagement similar to hooks may be formed, allowing the computer bracket to be stably hung and may not be easily detached from the steering wheel. The support element 3 may alternatively be configured as a plate-shaped structure. An end of the plate-shaped structure away from the movable portion 2 is bent towards a side of the plate-shaped structure to form the hook portion.

Further, as shown in FIGS. 23, 26, 28, and 19, the support surface includes a flat support surface 32 formed on the support element 3, and an angle between the flat support surface 32 on the support plate 32 and the support surface on the curved hook portion 31 is an obtuse angle.

In the present embodiment, in order to achieve easy storage and improved support stability, each of the support element 3 and the curved hook portion 31 is configured to be the plate-shaped structure. Generally, the support element 3 and the bent hook portion 31 are configured as a one-piece and integral structure to improve structural strength. The support element 3 may be configured as a flat and straight plate to allow the flat support surface 32 to be formed on the support element 3. The support surface formed on the curved hook portion 31 may be a curved surface or a flat surface that is smoothly transitioned from the flat support surface 32 on the support element 3. It will be understood that a curvature of the steering wheel may be varied slightly due to different models of cars. Since the end of the support element 3 is connected to the curved hook portion 31, the angle between the flat support surface 32 on the support plate 32 and the support surface on the curved hook portion 31 is the obtuse angle. When the two foldable support assemblies 10 are respectively hung to the steering wheel, the support elements 3 of the two foldable support assemblies 10 are adapted to clamp, in a left direction and in a right direction, steering wheels of different sizes. The curved hook portions 31 of the two foldable support assemblies 10 allows the bracket assembly 4 or the rear of the laptop computer to clamp different sized steering wheels in a forward and in a backward direction. Compared to support surfaces formed on the support element 33 and the curved hook portion 31 being curved overall, the structure in the present embodiment allows the two foldable support assemblies 10 to be stably connected to steering wheels of various sizes.

In addition, since the angle between the flat support surface 32 on the support plate 32 and the support surface on the curved hook portion 31 is the obtuse angle, when the two foldable support assemblies 10 are placed on the desktop, the entire support elements 33 may be tilted outwardly to form a stable support structure for the bracket assembly 4 or the laptop computer. In this way, the support element 33 is less likely to fall over by being accidentally touched by an external force.

Figure 23:
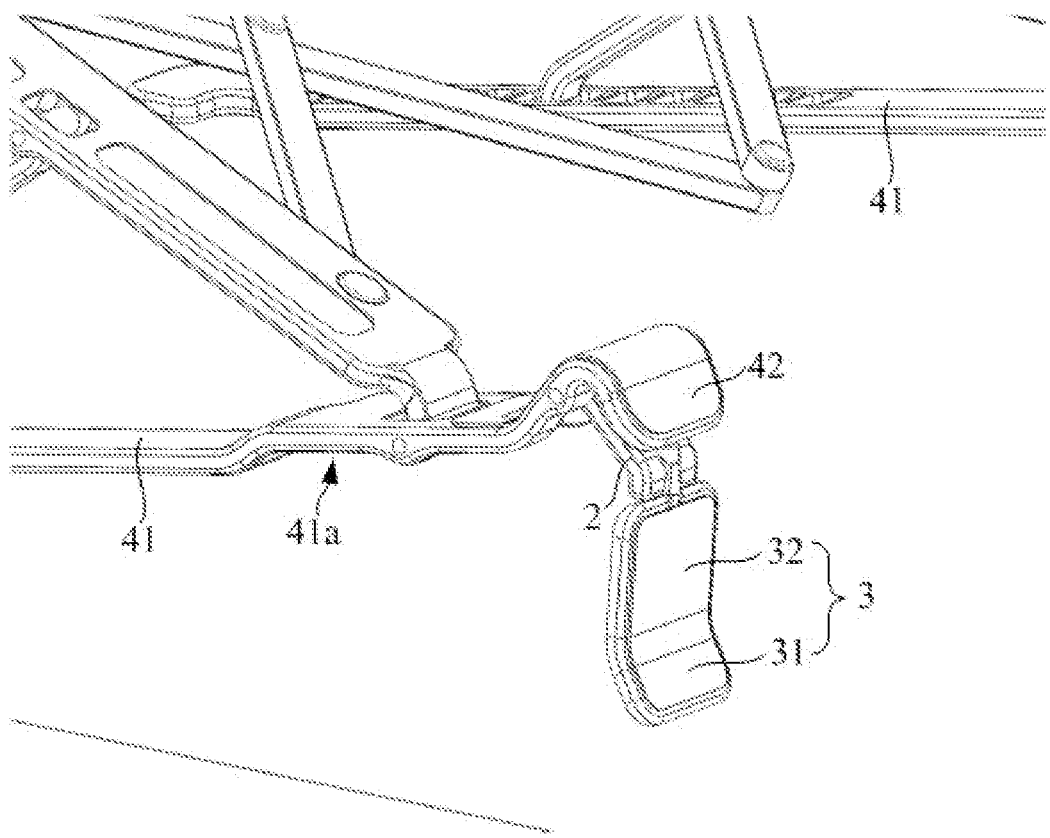
FIG. 23 are structural schematic views of steering-wheel computer brackets according to still other embodiments of the present disclosure.
Figure 24:
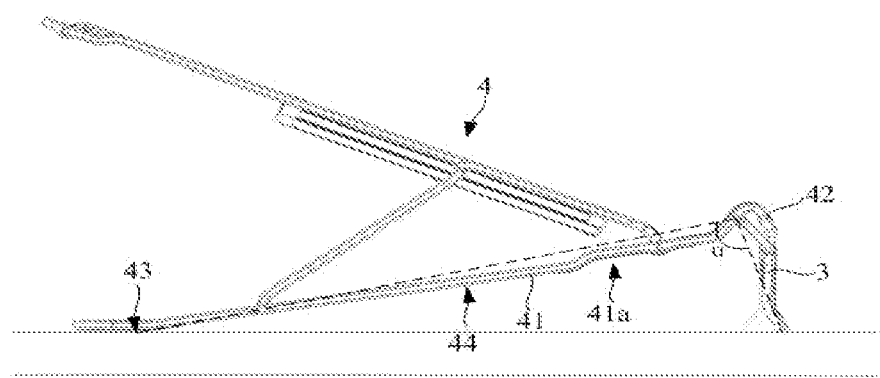
FIG. 24 is a left view 1 of the steering-wheel computer bracket shown in FIG. 23.
Figure 25:
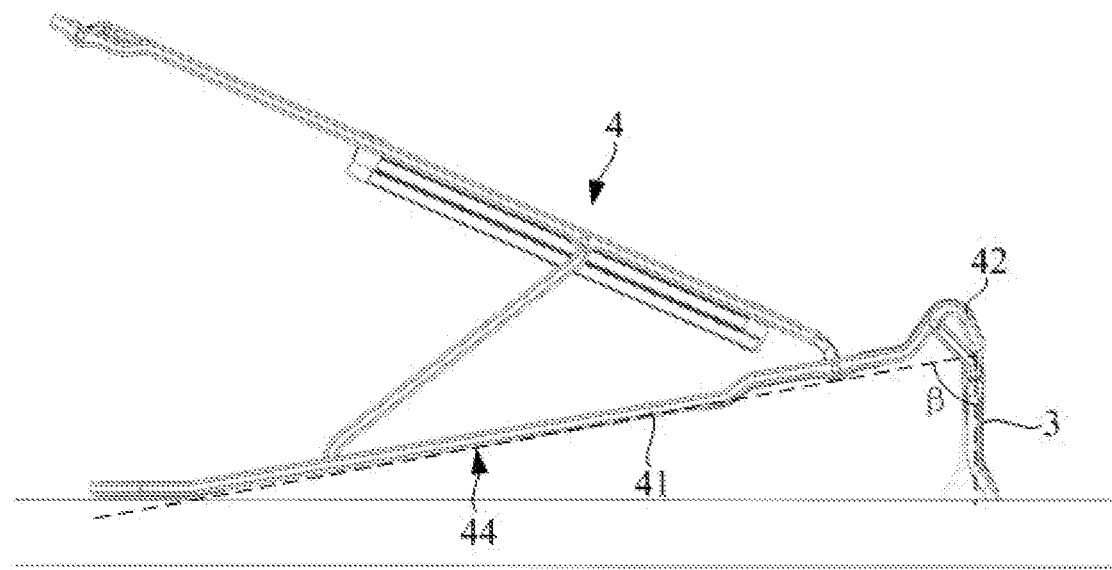
FIG. 25 is a left view 2 of the steering-wheel computer bracket shown in FIG. 23.

Further, as shown in FIGS. 23 to 25, the bracket assembly 4 includes a support base plate 41. An end of the support base plate 41 is bent downwardly to form a limiting portion 42. The end of the movable portion 2 winds around a horizontal shaft to be hinged to a bottom surface of the support base plate 41, enabling the other end of the movable portion 2 to flip outwardly to abut against the limiting portion 42. The support element 3 is configured around a vertical shaft to be rotationally connected to the other end of the movable portion 2.

In the present embodiment, for ease of illustration, a direction of the bracket assembly 4 being placed on the desktop is taken as a reference in the following. The support base plate 41 may be a one-piece rectangular base plate, or may include at least two elongated strip-shaped base plates. Since the end of the support base plate 41 is bent downwardly to form the limiting portion 42, an edge of the support base plate 41 is prevented from being unsmooth. In some embodiments, the end of the support base plate 41 extends upwardly to be inclined and then is bent downwardly to form the limiting portion 42. In this way, the upwardly inclined part of the support base plate 31 may be configured as a support structure for a lower edge of the computer.

The fixed portion 1 of the foldable support assembly 10 and the support base plate 41 may be configured as a one-piece and integral structure. When the end of the movable portion 2 winds around the horizontal shaft to be hinged to the bottom surface of the support base plate 41, the movable portion 2 may swing back and forth relative to the support base plate 41. Since the limiting portion 42 abuts against and limits a position of the movable portion 2, a maximum angle that the movable portion 2 is flipped outwardly is limited. In this way, the support element 3 may be prevented from flipping outwardly and falling over, due to weight of the laptop computer being excessively large. The support element 33 of the foldable support assembly 10 is configured around the vertical shaft to be rotatably connected to the other end of the movable portion 2, and that is, the foldable support may rotate 360 degrees around the vertical shaft on the horizontal plane.

Further, a hinge-connection axis of the movable portion 2 does not intersect with a rotation axis of the support element 3.

In the present embodiment, each of the movable portion 2 and the support element 3 is a plate-shaped structure. In this case, a plate extension direction of the movable portion 2 intersects with a plate extension direction of the support element 3. It will be understood that a triangular support structure is formed by the support base plate 41 and the support element 3 and is fixedly arranged on the desktop and the steering wheel. When the entire bracket is placed on the desktop, as the angle between the support base plate 41 and the support element 3 is increased, the entire bracket may be placed more stably. When the entire bracket is hung on the steering wheel, as the angle between the support base plate 41 and the support element 3 is decreased, the entire bracket may be hung to the steering wheel more easily. Since the hinge-connection axis of the movable portion 2 does not intersect with the rotation axis of the support element (as shown in FIG. 24 and FIG. 25), compared to a structure of the two axes being intersected with each other, the structure in the present embodiment allows a support angle of the steering-wheel computer bracket when the computer bracket being placed on the desktop to be different from a clamping angle of the steering-wheel computer bracket when the computer bracket being hung to the steering wheel. Therefore, the steering-wheel computer bracket may be better applicable to various scenarios. In addition, when the bracket is placed on the desktop, the entire support element 3 may flip outwardly, to a smaller extent, relative to the movable portion 2, such that the entire bracket occupies a small space, and the user experience is improved.

Combining with the above embodiment in which the hinge-connection axis of the movable portion 2 is not intersected with the rotation axis of the support element 3, as shown in FIGS. 24 and 25, the support base plate 41 has a first abutting region 43 configured to contact the desktop and a second abutting plane 44 configured to contact the steering wheel.

When the bracket is placed on the desktop, the movable portion 2 is flipped outwardly to abut against the limiting portion 42. When the support element 33 is rotated to allow the support surface to face outwardly, an angle between a line connecting the first abutting region 43 with the hinge-connection axis of the movable portion 2 and a line connecting the hinge-connection axis of the movable portion 2 with the free end of the curved hook portion 31 is an obtuse angle (shown as the angle α in FIG. 24).

When the bracket is hung to the steering wheel, the two support elements 33 are unfolded and respectively hung to two sides of the upper edge of the steering wheel. When the support element 33 is rotated to allow the support surface to face the steering wheel, an angle between the second abutting plane 44 and the rotation axis of the support element 3 is an acute angle (shown as the angle β in FIG. 25).

In the present embodiment, it will be understood that, the first abutting region 43 is disposed at an end of the support base plate 41 away from the foldable support assembly 10. When the bracket assembly 4 is placed on the desktop, and when the movable portion 2 is flipped outwardly to abut against the limiting portion 42, the first abutting region 43, the hinge point between the movable portion 2 and the support base plate 41, and the support element 33 cooperatively form a support structure having a large span. Since the angle between the line connecting the first abutting region 43 with the hinge-connection axis of the movable portion 2 and the line connecting the hinge-connection axis of the movable portion 2 with the free end of the hook portion 31 is the obtuse angle, the support structure formed by the bracket assembly 4 and the foldable support assembly 10 is more stable and reliable, and is less likely to fall over accidentally.

The second abutting plane 44 is a bottom surface of the support base plate 41. When the bracket assembly 4 is hung to the steering wheel, and when the support element 33 is rotated to allow the support surface to face the steering wheel, an acute-angle hook structure is formed by the second abutting plane 44 and the rotation axis of the support element 3. Since the angle between the second abutting plane 44 and the rotation axis of the support element 3 is the acute angle, the hook structure formed by the bracket assembly 4 and the foldable support assembly 10 may tightly clamp inwardly the steering wheel. In this way, the bracket assembly 4 may be detached from the steering wheel only by applying an upward force to the entire bracket assembly 4. Further, when the bracket assembly 4 is hung to the steering wheel and the laptop computer is placed on the bracket assembly, the laptop computer applies a gravitational force downwardly to press the foldable support assembly 10. In this way, the bracket assembly 4 may not be easily detached from the steering wheel by an external force accidentally, the steering-wheel computer bracket may be effectively prevented from being accidentally detached from the steering wheel, and connection between the steering-wheel computer bracket and the steering wheel is more stable.

In combination with the above embodiment in which the bracket assembly 4 and the curved hook portion 31 are arranged, the bottom surface of the bracket assembly 4 is partially recessed to form a storage slot 41a. The curved hook portion 31 is at least partially is foldable and stored in the storage slot 41a. In this way, when the entire foldable support assembly 10 is folded relative to the bracket assembly 4, the hook portion 31 may be partially or fully received in the storage slot 41a. In this way, a thickness of the foldable support assembly 10 after being folded may be reduced and may be easily stored.

In addition, when the support surface is curved, the maximum opening angle between the support element 3 and the bracket assembly 4 may be reasonably adjusted based on the curvature of the curved support surface, as long as the support surface is able to be stably and inversely hung to the upper edge of the steering wheel.

In the present embodiment, the bracket assembly 4 is configured to allow the laptop computer to be placed thereon. While in use, the two foldable support assemblies on one side of the bracket assembly 4 are unfolded (i.e., the support elements 3 are unfolded). The two support elements 3 are respectively hung to two sides of the upper edge of the steering wheel. The bracket assembly 4 may be attached to a front side of the steering wheel (the upper). Inclination of the bracket assembly 4 is consistent with inclination of the steering wheel, such that the laptop computer may be stably used and operated. In some embodiments, the bracket assembly 4 may be placed on the flat desktop. The support elements 3 may be selectively unfolded. The laptop computer is used by being placed on an upper of the bracket assembly 4. The support elements 3 being unfolded or folded may adjust an inclination angle of the bracket assembly 4 and the laptop computer, such that a user may operate the laptop computer at a comfortable angle.

In the present embodiment, a surface of the support element 3 is a rough surface. In the above embodiment, the rough surface can increase friction between the support element 3 and other components contacting the support element 3. For example, when the support element 3 is supported on the desktop, the rough surface may have an anti-slipping function. In another example, the support elements 3 are unfolded to be hung to the upper edge of the steering wheel, the friction allows the support elements 3 to be stably hung to the steering wheel.

In another embodiment, the surface of the support element 3 is covered by a soft package layer that has the anti-slipping function.

In the above embodiment, a rubber layer may be arranged to serve as the soft package layer. The rubber layer may protect the leather surface of the steering wheel or the desktop, and friction between the rubber layer and other components contacting the rubber layer.

In an embodiment, as shown in FIGS. 11 to 22, two sides of an end of a side of the bracket assembly 4 define two assembling slots respectively. Two fixed portions 1 of the two foldable support assemblies are fixedly received in the two assembling slots respectively. The support elements 3 of the foldable support assemblies may be moved to reach and folded into the two assembling slots respectively. Further, the support elements 3 of the foldable support assemblies may be unfolded and extend out of the two assembling slots, and support the side of the bracket assembly 4.

In the above embodiment, the assembling slots are defined to allow the foldable support assemblies to be folded and completely received in the assembling slots. In this way, the side of the bracket assembly 4 may not have a protruding structure after the foldable support assemblies is folded, and an overall appearance of the bracket assembly 4 is more aesthetically pleasing. Furthermore, a space for storing the folded bracket assembly 4 is reduced. While in use, the foldable support assembles are unfolded to protrude out from the side of the bracket assembly 4.

In the present embodiment, the bracket assembly includes at least the following structural forms.

Figure 8:
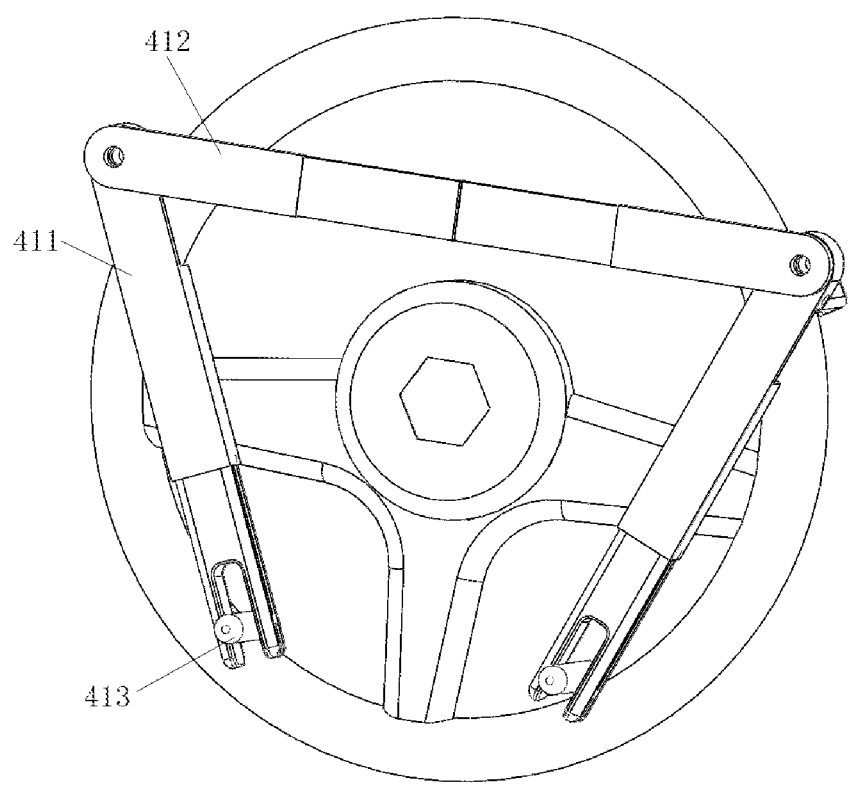
FIG. 8 is a structural schematic view of a steering-wheel computer bracket according to an embodiment of the present disclosure.
Figure 9:
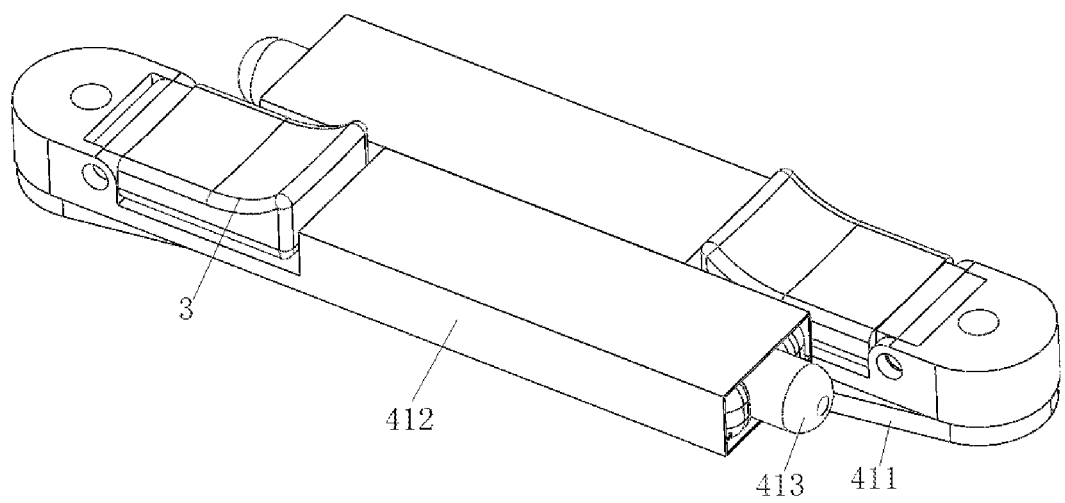
FIG. 9 is a structural schematic view of the steering-wheel computer bracket shown in FIG. 8 being folded and stored.
Figure 10:
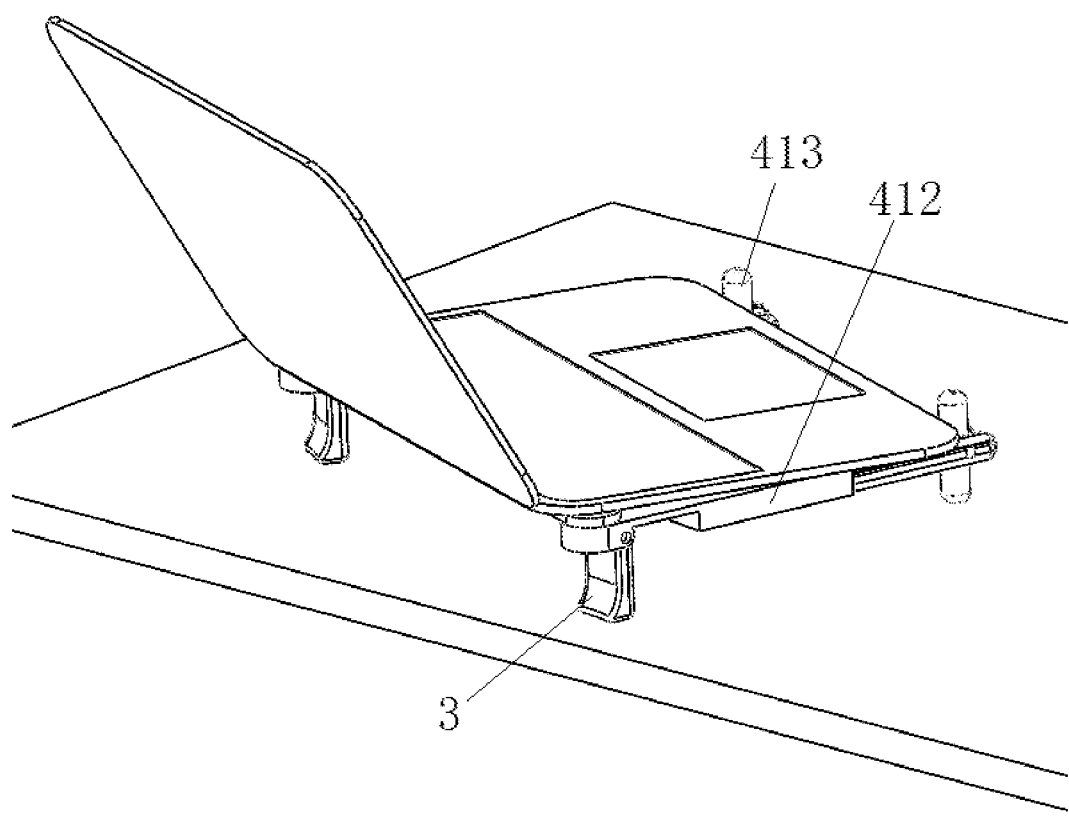
FIG. 10 is a structural schematic view of the steering-wheel computer bracket shown in FIG. 8 being used on a desktop.

(1). As shown in FIG. 8, FIG. 9, and FIG. 10, the bracket assembly 4 includes two extension-retraction support rods 411 located in a same plane and one extension-retraction connecting rod 412. One of two ends of the extension-retraction connecting rod 412 is rotationally connected with an end of one of the two extension-retraction support rods 411, and the other one of two ends of the extension-retraction connecting rod 412 is rotationally connected with an end of the other one of the two extension-retraction support rods 411. One of the two foldable support assemblies is assembled to a side of one of the two extension-retraction support rods 411, corresponding to the end connected to the extension-retraction connecting rod 412. The other one of the two foldable support assemblies is assembled to the side of the other one of the two extension-retraction support rods 411, corresponding to the end connected to the extension-retraction connecting rod 412. For each of the two extension-retraction support rods 411, the other one of the two ends the extension-retraction support rod 411 defines a strip-shaped groove along a length direction of the support rod. A support rod 413 is received in the strip-shaped groove. The support rod 413 may be rotated, by an external force, to be embedded in the strip-shaped groove. Alternatively, the support rod 413 may be rotated to pass through two sides of the strip-shaped groove, and an angle between the support rod 413 and the corresponding extension-retraction support rod 411 (in the range of 80-100°) is formed.

In the above embodiment, while folding, two extension-retraction support rods 411 and one extension-retraction connecting rod 412 may be folded into one strip to be stored. While in use, an external force may be applied to unfolding the two extension-retraction support rods 411 and one extension-retraction connecting rod 412 with respect to each other, to form an "n"-shaped structure. The "n"-shaped structure may be placed flat on the desktop. Alternatively, the support elements 3 may be unfolded, and further the extension-retraction connecting rod 412 is placed lateral on the support elements 3. The support elements 3 are configured to adjust the hanging angle, and the extension-retraction connecting rod 412 is hung to the upper edge of the steering wheel (the two support elements 3 may be distributed into a "v" shape). Further, after the two extension-retraction support rods 411 are extended and retracted to reach suitable lengths, the support rod 413, located at the other end of each of the two extension-retraction support rods, is flipped to reach a position of having an angle with respect to the corresponding one of the two extension-retraction support rods. The support rod 413 is hung to a lower of the inner edge of the steering wheel. Further, the laptop computer is attached to the other side of a frame body formed by the two extension-retraction support rods 411 and one extension-retraction connecting rod 412, and a lower edge of the laptop computer is supported on the unfolded support rods 413. An overall structure of the entire computer bracket is simple, occupies a small space, and is easily stored.

Specifically, the two foldable support assemblies are mounted on the two extension-retraction support rods 411 respectively. The two extension-retraction support rods 411 serve as load-bearing rods. Since the foldable support assemblies are rotatable, the support elements 3 may rotate at an arbitrary angle relative to the load-bearing rods (extension-retraction support rods). In this way, the support elements 3 may be rotated to be tangent and attached to the outer edge of the steering wheel, regardless of the two extension-retraction support rods 411 being parallel, when being unfolded, to each other or any angle being generated between the two extension-retraction support rods 411. For example, as shown in FIG. 8, when the two extension-retraction support rods 411 are in use, an angle is generated between the two extension-retraction support rods 411. The angle between the two extension-retraction support rods 411 is not fixed, since the sizes of the steering wheels and usage habits are various. The present embodiment demonstrates that the rotatable nature of the foldable support assembly 10 allows the bracket assembly 4 to have a highly flexible structure form.

Figure 11:
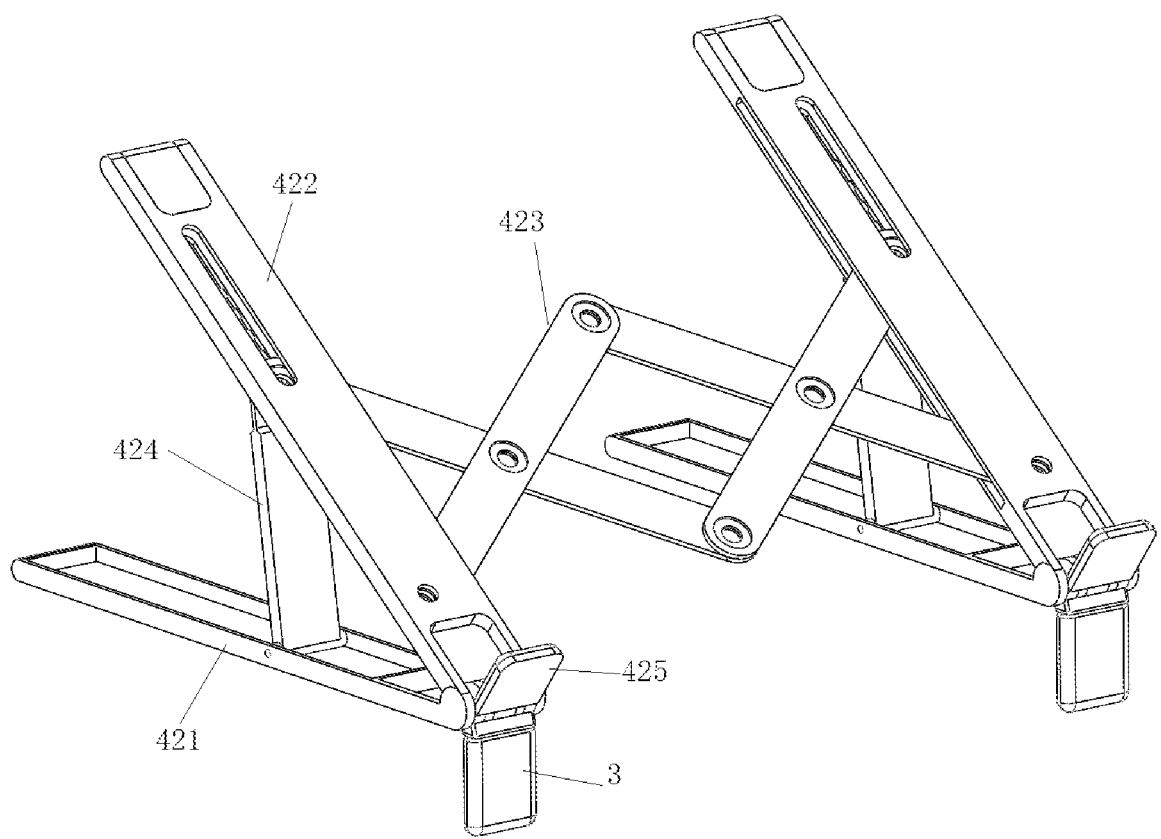
FIG. 11 is a structural schematic view of a steering-wheel computer bracket according to another embodiment of the present disclosure.
Figure 12:
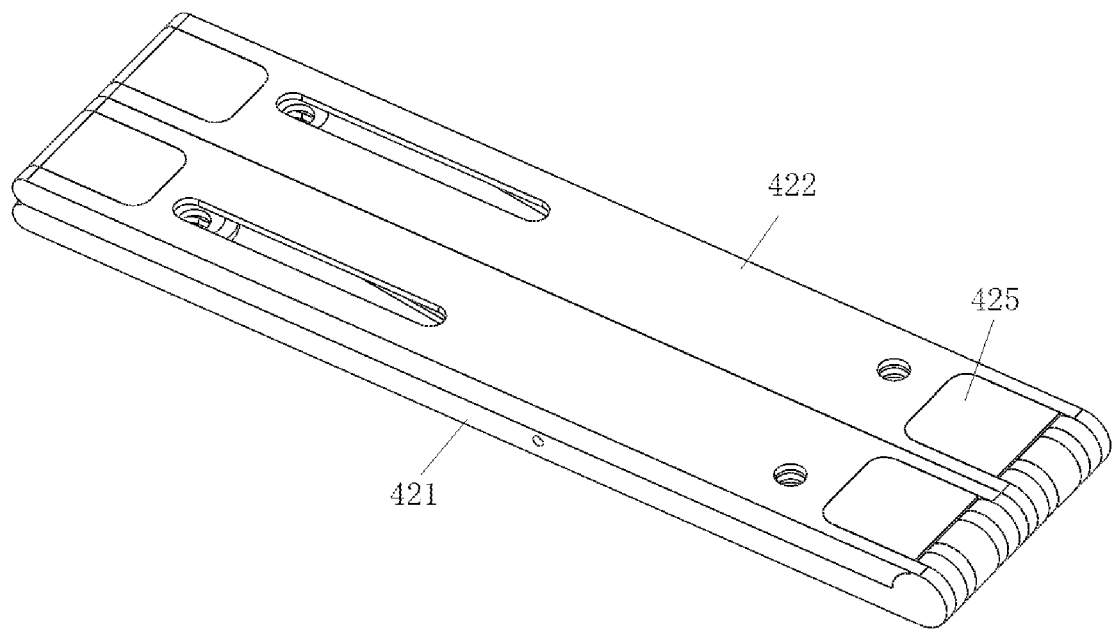
FIG. 12 is a structural schematic view of the steering-wheel computer bracket shown in FIG. 11 being folded and stored.
Figure 13:
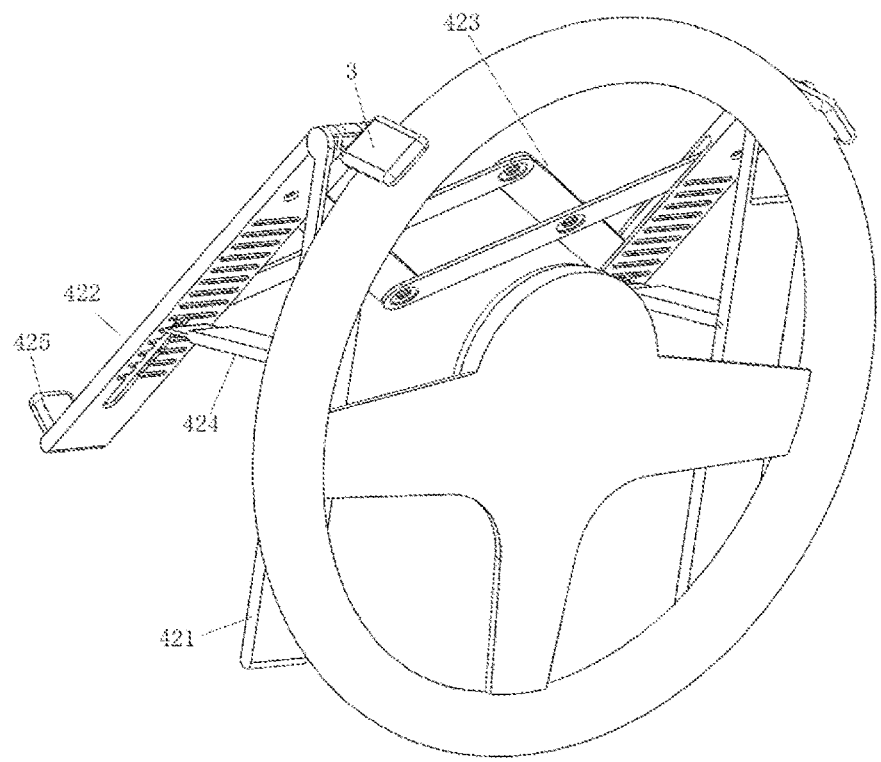
FIG. 13 is a structural schematic view of the steering-wheel computer bracket shown in FIG. 11 being used on a steering wheel.

(2). As shown in FIG. 11, FIG. 12, and FIG. 13, the bracket assembly 4 includes two strip-shaped first support base plates 421 located on a same plane, two strip-shaped first support panels 422, and a first shear-typed extension-retraction frame 423. The two first support base plates 421 are parallel to each other. For each of the two first support base plates 421, the foldable support assembly is arranged to a side of an end of the first support base plate 421. An end of each of the two first support panels 422 is respectively hinged to the other side of the end of the corresponding one of the two first support base plates 421. Each of the two first support panels 422 may be flipped and folded, by an external force, to the corresponding one of the two first support base plates 421. Alternatively, each of the two first support panels 422 may be flipped and folded, by the external force, to have an angle with the corresponding one of the two first support base plates 421. Each of the two first support panels 422 is fixed to the corresponding one of the two first support base plates 421 by a first support member 424. For each of the two first support panels 422, a side of an end of first support panel 422 away from the corresponding first support base plate 421 is rotatably arranged with a first support portion 425. The first support part 425 is rotationally folded into the corresponding first support panel 422 or rotated to reach a position having an angle relative to the corresponding first support panel 422 (in the range of 80-100°). One of the two first support panels 422 has a first side near the other one of the two first support panels 422, and the other one of the two first support panels 422 has a second side near the one of the two first support panels 422. Two ends of the first shear-typed extension-retraction frame 423 are connected to the first side and the second side respectively. The first shear-typed extension-retraction frame 423 may be extended and retracted under an external force to enable the two first support panels 422 to approach to or to move away from each other.

In the above embodiment, while being folded, the first shear-typed extension-retraction frame 423 may be retracted by the external force, such that the two strip-shaped first support base plates 421 move to approach to and in parallel to each other, and the two strip-shaped first support panels 422 move to approach to and in parallel to each other. While in use, the first shear-typed extension-retraction frame 423 may be extended, by the external force, to have an appropriate size, and the bracket assembly may be placed flatly on the desktop. Alternatively, after unfolding the support elements 3, the bracket assembly may be hung, via the support elements 3, to two sides of the upper edge of the steering wheel, allowing the entire support assembly 4 to attach to the front of the steering wheel. Further, the corresponding first support portions 425 are unfolded to support the lower edge of the laptop computer (the rear of the laptop computer is attached to upper surfaces of the two first support panels 422). The entire support assembly has a small size when being stored. A width of the support assembly, when being unfolded for usage, may be adjusted easily by stretching or contracting the first shear-typed extension-retraction frame 423. More specifically, when the support assembly is placed on the desktop, the first support base plates 421 are placed flat, the support elements 3 may be unfolded to be supported on the desktop or folded. The first support panels 422 may be flipped to have angles with respect to the first support base plates 421. The laptop computer may be inclined and placed on top of the first support panels 422. The lower edge of the laptop computer is supported on the first support portions 425 corresponding to the downwardly-inclined ends of the first support panels 422. When the laptop computer is hung to the steering wheel, the two support elements 3 are unfolded and hung to two sides of the upper edge of the steering wheel respectively. The first support portions 425 at the downwardly-inclined ends of the first support panels 422 are unfolded. In addition, the angle between the first support panel 422 and the first support plate 421 is adjusted, the laptop computer is placed on the upper of the first support panels 422 at a suitable angle, and the lower edge of the laptop computer is supported on the lower of the first support portions 425.

Figure 14:
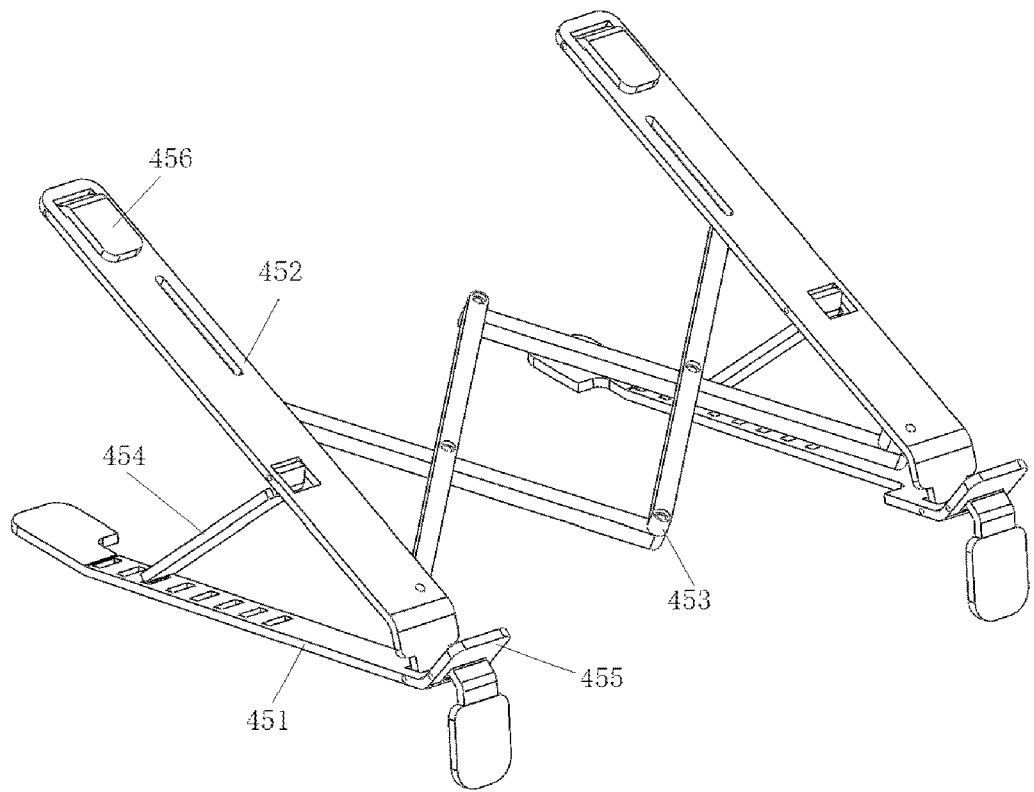
FIG. 14 is a structural schematic view of a steering-wheel computer bracket according to still another embodiment of the present disclosure.
Figure 15:
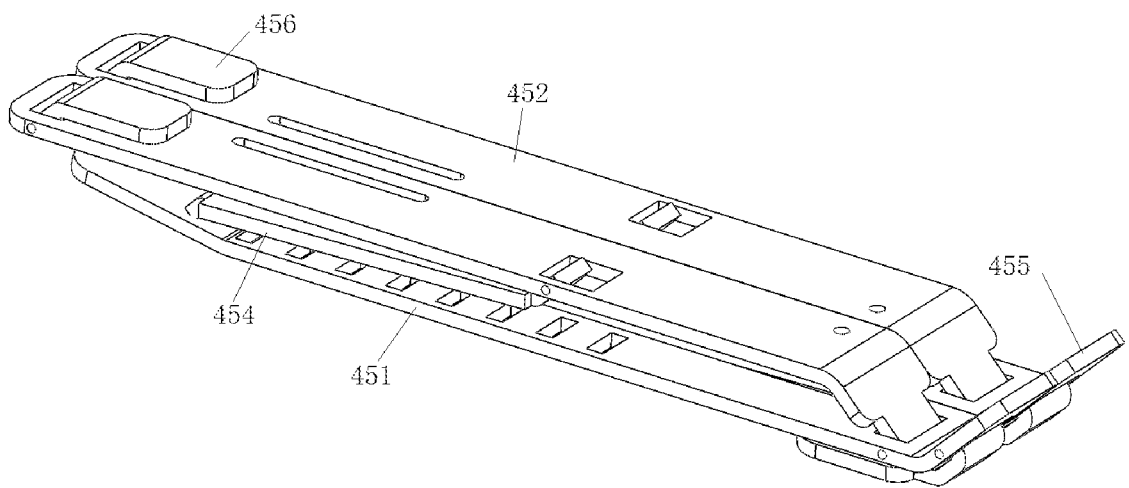
FIG. 15 is a structural schematic view of the steering-wheel computer bracket shown in FIG. 14 being folded and stored.
Figure 16:
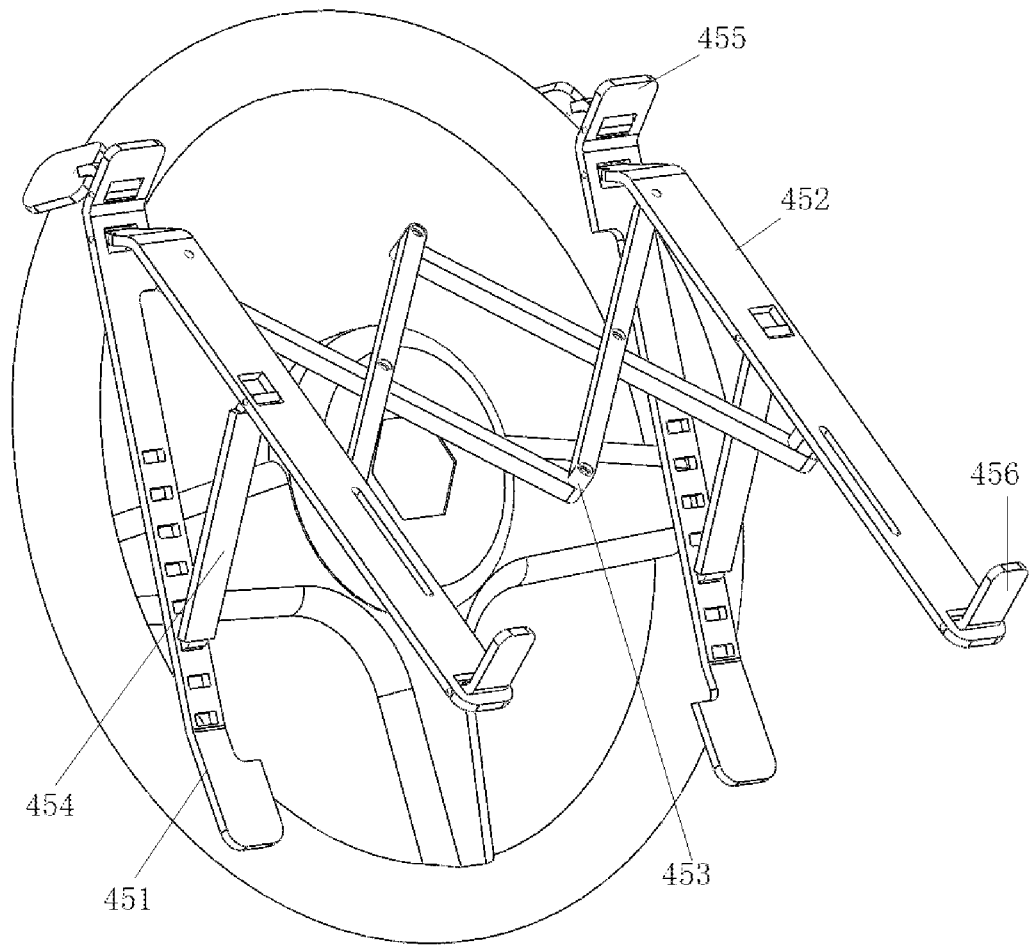
FIG. 16 is a structural schematic view of the steering-wheel computer bracket shown in FIG. 14 being used on a steering wheel.

(3) As shown in FIG. 14, FIG. 15, and FIG. 16, the bracket assembly 4 includes two strip-shaped second support base plates 451 located on a same plane, two strip-shaped second support panels 452, and a second shear-typed extension-retraction frame 453. The two second support base plates 451 are parallel to each other. For each of the two second support base plates 451, an end is arranged with a curved portion 455 being bent towards the other side of the second support base plate 451. The foldable support assembly is arranged to a side of the curved portion 455. The two second support panels 452 and the two second support base plates 451 are in one-to-one correspondence with each other, and for one of the two second support panels 452 and a corresponding one of the two second support base plates 451, an end of the second support panel 452 is hinged to the other side of the end of the second support base plate 451. The two second support panels 452 may be flipped and folded, under the external force, onto the two second support base plates 451, respectively. Each second support panel 452 is flipped and folded, the external force, to have an angle with respect to the corresponding second support base plate 451. The second support panel 452 is fixed to the corresponding second support base plate 451 by the corresponding second support member 454. A side of the other end of the second support panel 452 away from the second support base plate 451 is rotatably arranged with a second support portion 456. The second support portion 456 may be rotated and folded onto the corresponding second support panel 452 or rotated to reach a position of having an angle with respect to the corresponding second support panel 452 (in a range of 80-100°). One of the two second support panels 452 has a first side near the other one of the two second support panels 452, and the other one of the two second support panels 452 has a second side near the one of the two second support panels 452. Two ends of the second shear-typed extension-retraction frame 453 are connected to the first side and the second side respectively. The second shear-typed extension-retraction frame 453 may be extended and retracted under the external force to enable the two second support panels 452 to approach to or to move away from each other.

In the above embodiments, a shape of the bracket assembly 4 is substantially similar to that of the structure shown in (2). A manner of storing and unfolding the bracket assembly 4 is also the same as that shown in (2). The difference therebetween relies in the following. The curved portion 455 may serve as the support portion. When the bracket assembly is placed on the desktop, each second support panel 452 is flipped to reach a position having an angle (inclined) with respect to the respective second support base plate 451. In this case, the curved portion 455 is located at the downwardly-inclined end. In addition, when the laptop computer is placed on the upper of the inclined second support panels 452, the lower edge of the laptop computer may abut against the curved portion 455. The entire curved portion 455 serves as the support portion configured to support the laptop computer. When the laptop computer is hung to the steering wheel, the curved portion 455 is located at the upwardly-inclined end of the bracket assembly 4, and the second support portion 456 at the other end of the second support panel 452 is configured to support the lower edge of the laptop computer.

To be noted that, in practice, the curved portion 455 and the respective fixed portion 1 of the support element 3 may be configured as a one-piece and integral structure. The curved portion 455 and the respective fixed portion 1 may be fused with each other to form one component.

(4). As shown in FIG. 17 and FIG. 18, based on the structure shown in (3), the structure of the support element 3 is improved. In the present embodiment, for the support element 3, an end of the support element 3 away from the movable portion 2 is bent towards a side of the support element 3 to form a curved hook portion (shown by e in the drawings). In this way, while in use, the curved hook portion may stably hook the upper edge of the steering wheel. A manner of using the curved hook portion on the desktop is the same as that shown in (3), and will not be repeated herein.

In addition, in the embodiments shown in (3) and (4), an end of the second support base plate 451 is protruding towards the other side of the second support base plate 451 to form a step, and a step groove (shown by f in FIG. 18) for receiving the support element 3 is defined. When the support element 3 is folded to be stored, a majority of a body portion (the portion other than the curved portion or the curved hook portion) of the support element 3 may be folded to be hidden in the step groove. Alternatively, the entire body portion of the support element 3 is folded to be hidden in the step groove, and the entire support element 3 may not protrude out from the side of the second support base plate 451.

Figure 19:
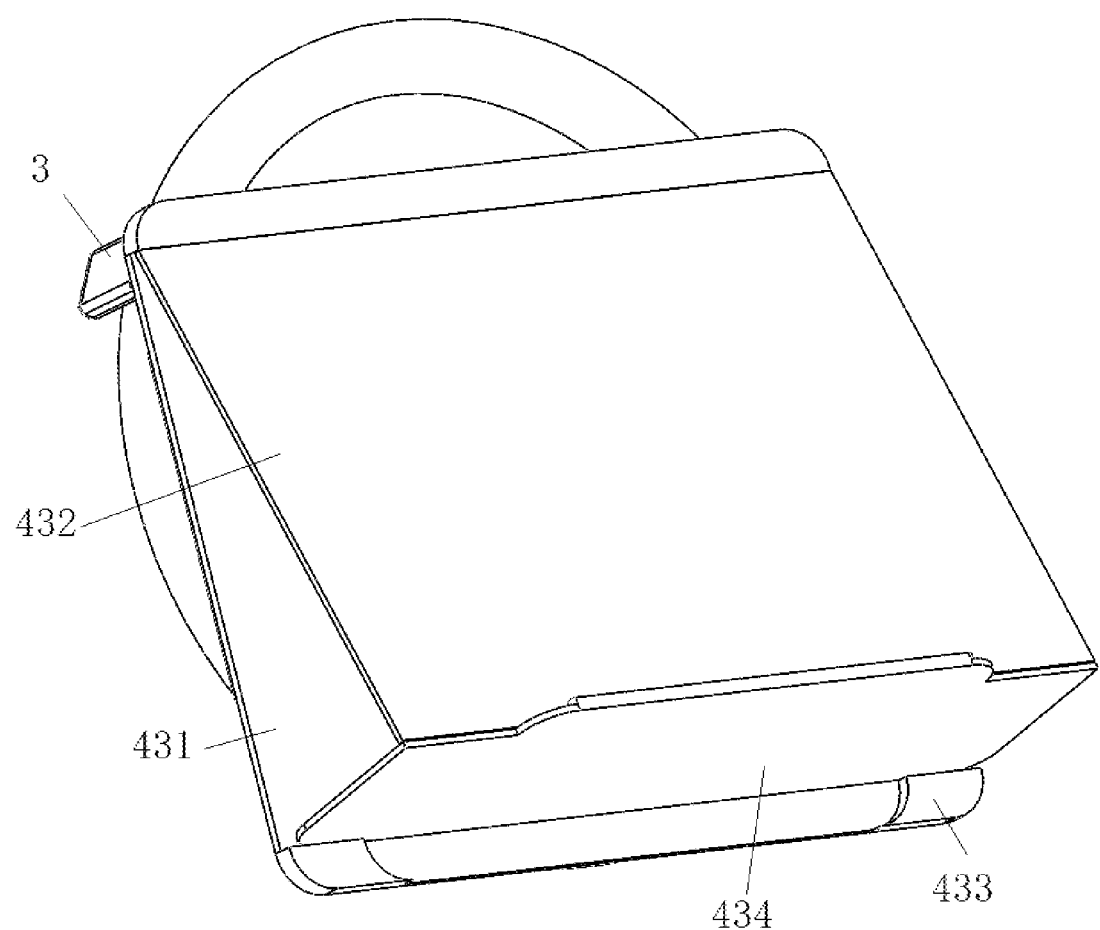
FIG. 19 is a structural schematic view of the steering-wheel computer bracket according to still another embodiment of the present disclosure.
Figure 20:
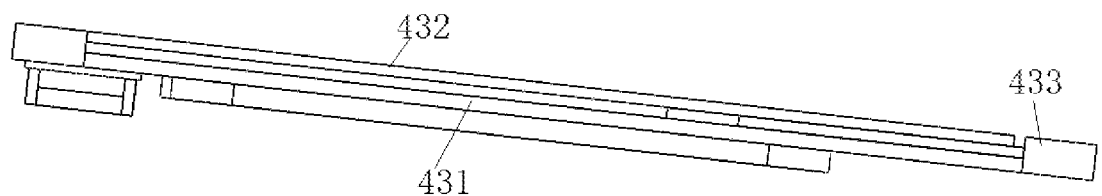
FIG. 20 is a structural schematic view of the steering-wheel computer bracket shown in FIG. 19 being folded and stored.

(5) As shown in FIG. 19 and FIG. 20, the bracket assembly 4 includes a base plate support 431, a panel support 432, and a support board 434. The two foldable support assemblies are respectively arranged at two sides of an end of a side of the base plate support 431. The other end of the other side of the base plate support 431 is arranged with a strip-shaped protrusion 433, extending along an edge of the other end. An end of the panel support 432 is hinged to an end of the other side of the base plate support 431. An end of the support board 434 is hinged to the other end of panel support 432. The support board 434 may be flipped, by the external force, to attach to a side of the panel support 432 or to reach a position having at an angle with respect to the panel support 432. The panel support 432 may be flipped, by the external force, to attach to the other side of the base plate support 431 or to reach a position having at an angle with respect to the other side of the base plate support 431. In this state, the support board 434 may be flipped to reach a position having at an angle with respect to the panel support 432, and the other end of the support board 434 is lapped and supported on an inner edge of the protrusion 433. An angle is formed between the support board 434 and the base plate support 431 to support the panel support 432.

In the above embodiment, the bracket assembly 4 includes two panels. An end of the panel support 432 is hinged to the support board 434. After the panel support 432 is opened relative to the base plate support 431, the support board 434 is flipped to allow the other end of the support board 434 to abut against the protrusion 433. In this state, the panel support 432, the support board 434, and the base plate support 431 cooperatively form a triangular structure. The end of the support board 434 protrudes from a side of the panel support 432 away from the base plate support 431 (the protruding portion serves as a support portion for supporting the edge of the laptop computer). That is, the bracket assembly 4 may be used by unfolding the support elements 3 and hanging support elements 3 to the upper edge of the steering wheel. Of course, the entire bracket assembly may be flatly placed on the desktop, such that an angle is formed between the bracket assembly 4 and the desktop, and therefore, an inclination angle of the laptop computer may be adjusted.

Figure 21:
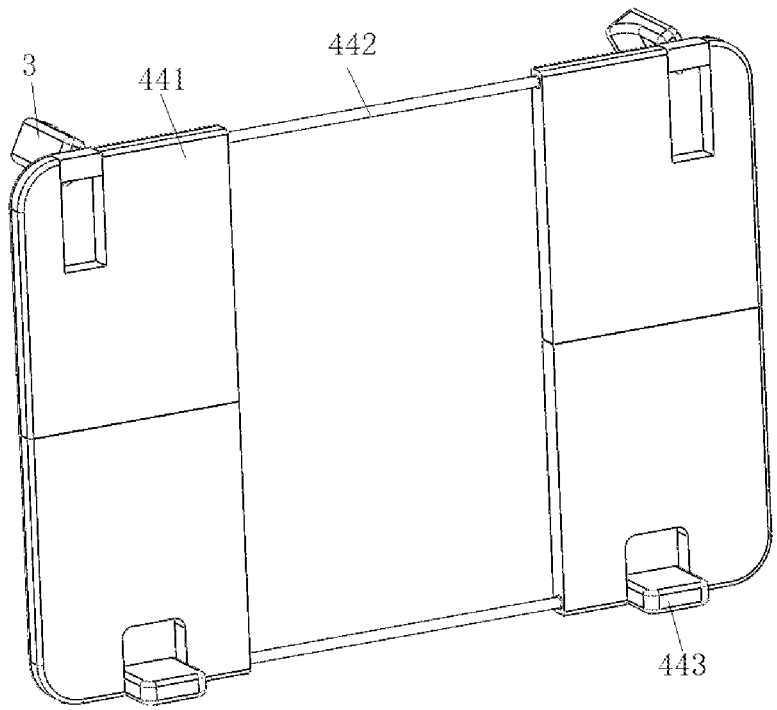
FIG. 21 are structural schematic views of steering-wheel computer brackets according to other embodiments of the present disclosure.
Figure 22:
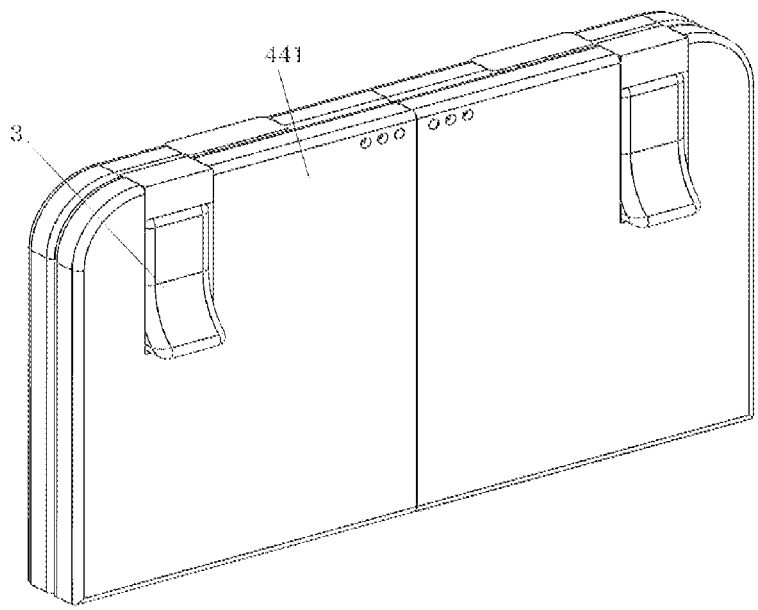
FIG. 22 is a structural schematic view of the steering-wheel computer bracket shown in FIG. 21 being folded and stored.

(6) As shown in FIG. 21 and FIG. 22, the above bracket assembly 4 includes two support sub-plates 441 located on a same plane. An end of a side of each of the two support sub-plates 441 is arranged with the foldable support assembly. For each of the two support sub-plates 441, a connecting rod 442 is inserted into an end of a side of the support sub-plate 441 near the other support sub-plate 441, and another connecting rod 442 is inserted into the other end of the side of the support sub-plate 441 near the other support sub-plate 441. The two support sub-plates 441 move, along the connecting rod 442, to approach to or away from each other. For each of the two support sub-plates 441, a computer support block 443 is rotatably arranged at the other end of the two support sub-plates 441. The computer support block 443 may be flipped onto the other side of the respective one of the two support sub-plates 441, or flipped to reach a position having an angle with respect to the other side of the respective support sub-plate 441 (in a range of 80-100°). Each support sub-plate 441 is formed by two plates being hinged with each other. The two plates are respectively located at two ends of the support sub-plate 441. The two plates may be flipped towards the other end of the support sub-plate 441 to attach to each other and folded with respect to each other, or flipped to be unfolded with respect to each other, enabling the two plates to be arranged on a same plane.

In the above embodiment, the two support sub-plates 441 may be moved to approach to or away from each other to achieve folding. In addition, a spacing between the two support elements 3 is adjusted to allow the two support elements 3 to take the appropriate spacing to be hung to two sides of the upper edge of the steering wheel. When the bracket assembly is hung to the steering wheel, the computer support block 443 is unfolded and protrudes from the side of the support sub-panel 441 away from the steering wheel, such that computer support block 443 may stably support the lower edge of the laptop computer. Of course, the bracket assembly is may be used by being placed flat on the desktop, while in use, the support elements 3 may be unfolded and supported on the desktop, enabling the support sub-plate 441 to have an angle relative to the desktop, such that the inclination angle of the laptop computer is adjusted. In addition, the support sub-plate 441 is formed by the two plates being hinged to each other, the entire bracket assembly may be folded into a small-sized plate and may be easily stored.

To be emphasized that, for each of the two support sub-plates 441, at least one connecting rod 442 is inserted into the end of the side of the support sub-plate 441 near the other support sub-plate 441, and at least one connecting rod 442 is inserted into the other end of the side of the support sub-plate 441 near the other support sub-plate 441. That is, the number of connecting rods 442 is at least two, alternatively, a plurality of connecting rods 442 may be arranged, connection between the support sub-plates 441 and the connecting rods is stronger.

In an embodiment, as shown in FIG. 9 and FIG. 15, the bracket assembly 44 includes two oppositely disposed carrier plates and an extension-retraction member movably connected to the two carrier plates. Each carrier plate is extending in a strip shaped. The extension-retraction member may be folded or unfolded in a width direction of the carrier plate, such that the two carrier plates may move to approach to or away from each other in the width direction. The fixed portions 1 of the two foldable support assemblies 10 are arranged to a same side of the two carrier plates, respectively.

When the movable portion 2 is hinged to the side of the fixed portion 1, an extension direction of the hinge-connection axis of the movable portion 2 is the same as the width direction of the carrier plate. In this way, when the support element 3 is flipped to approach to or attach to the carrier plate, the support element 3 extends along a length direction of the carrier plate.

When the end of the support element 3 is hinged to the movable portion 2, and when the support element 3 is flipped to approach to or attach to the carrier plate, a length direction of the support element 3 is in the same as the length direction of the carrier plate.

In this way, when the support element 3 is folded, the support element 3 extends along the length direction of the carrier plate. The width of the carrier plate may be set smaller. In this way, the folded bracket assembly 44 has a smaller width and a smaller size, and may be carried and stored more easily. To be noted that, the extension direction of the axis is the same as the width direction of the carrier plate, in this way, the extension direction of the axis is parallel to the width direction of the carrier plate, or an angle between the extension direction of the axis and the width direction of the carrier plate is not greater than 5 degrees.

In the present embodiment, structures of the carrier plate and the extension-retraction member may be referred to the previous embodiments, and will not be specifically limited herein. For example, the extension-retraction member may be an extension-retraction rod, a foldable frame 46, and so on. By arranging the extension-retraction frame to connect with the two carrier plates, the two carrier plates may be the folded and unfolded with respect to each other, and may be more easily stored. The two fixed portions 1 of the two foldable support assemblies 10 are respectively fixedly connected to the ends of the two carrier plates facing the same side.

Figure 26:
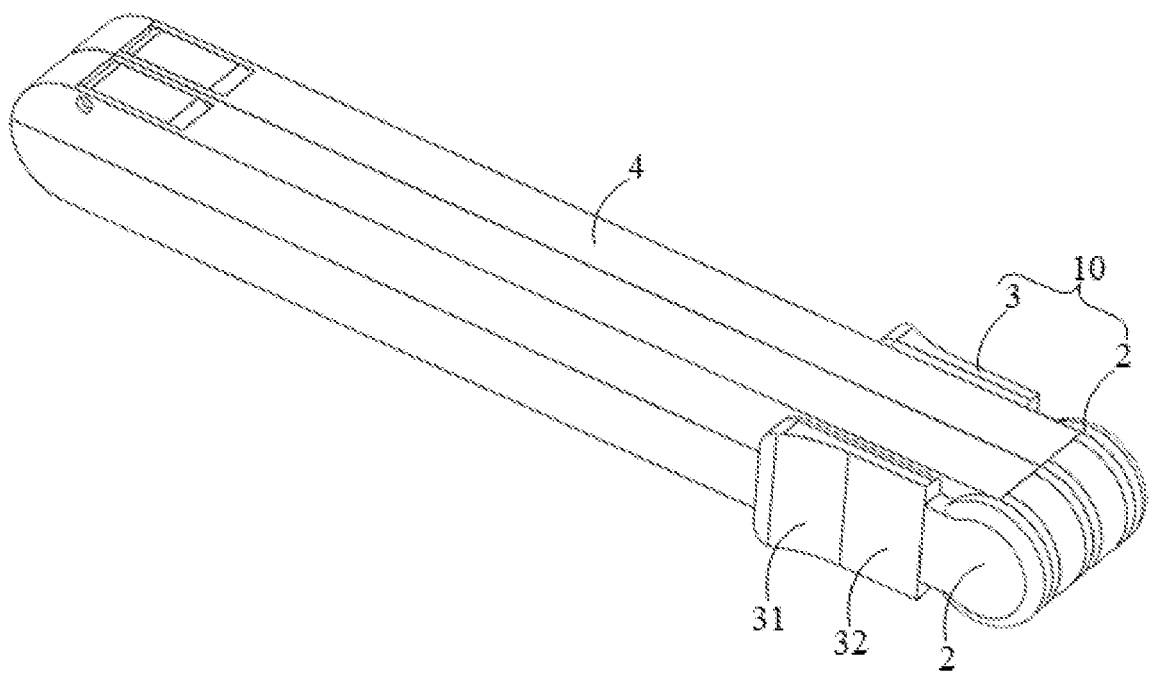
FIG. 26 are structural schematic views of the steering-wheel computer brackets being folded according to still other embodiments of the present disclosure.
Figure 27:
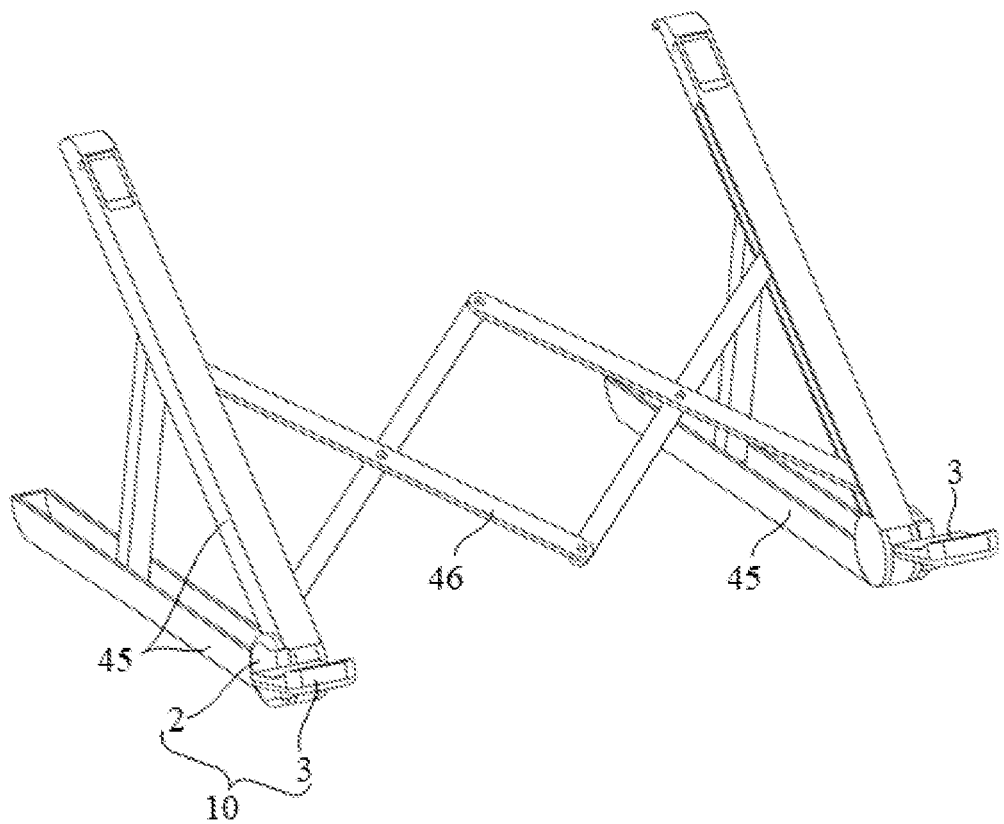
FIG. 27 is a structural schematic view of the steering-wheel computer bracket shown in FIG. 26 being unfolded and used on a desktop.
Figure 28:
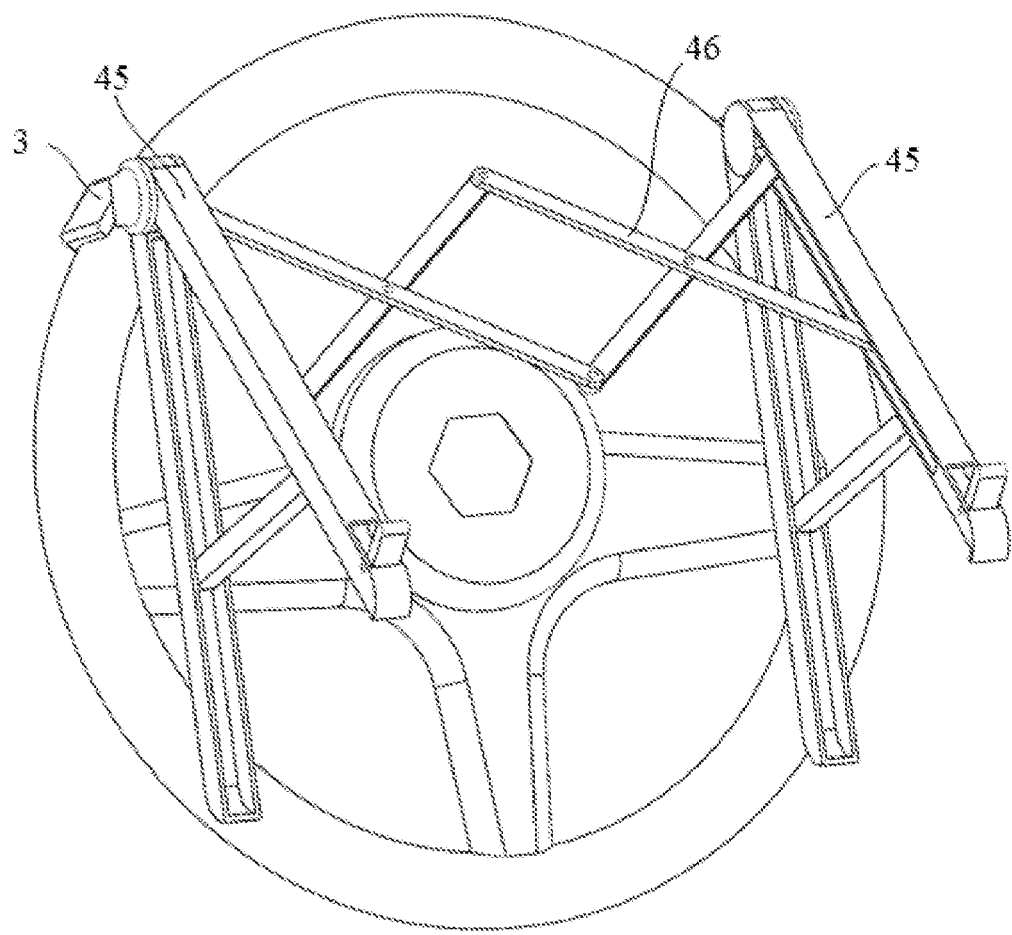
FIG. 28 is a structural schematic view of the steering-wheel computer bracket shown in FIG. 26 being unfolded and used on the steering wheel.
Figure 29:
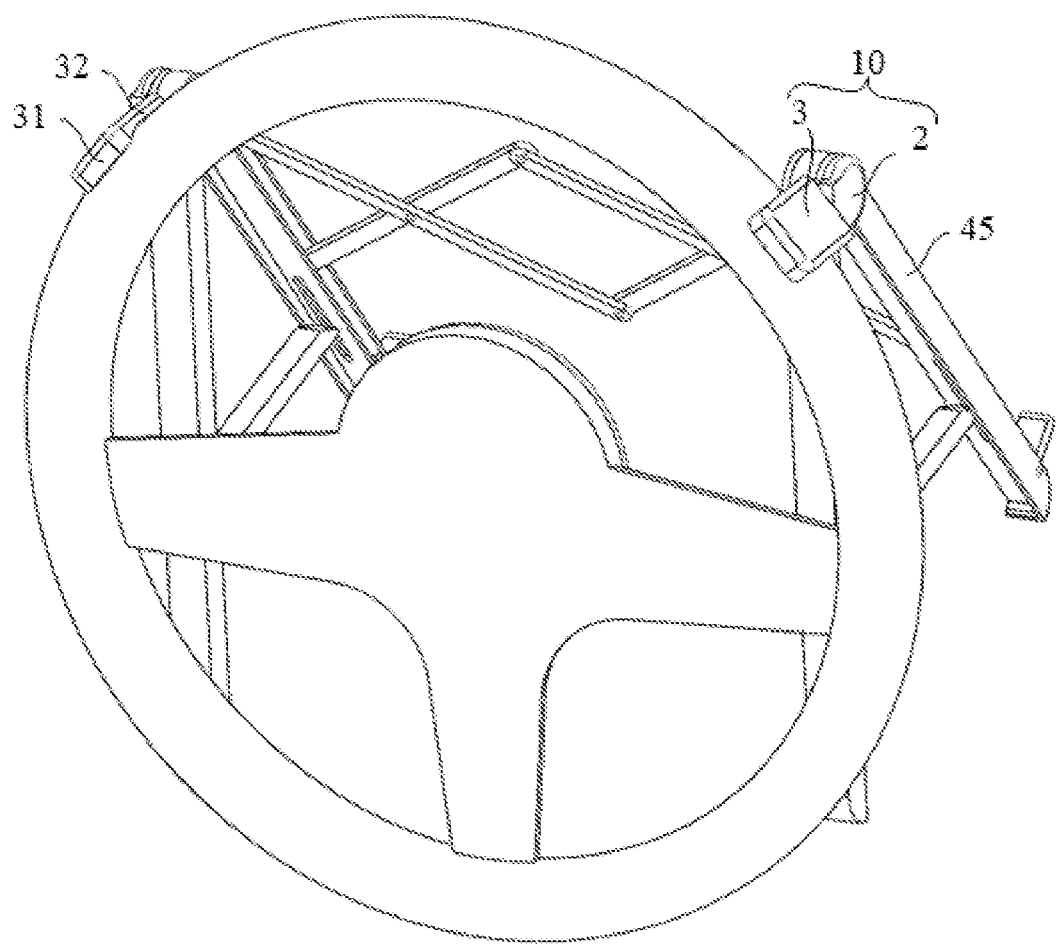
FIG. 29 is a structural schematic view of the steering-wheel computer bracket shown in FIG. 28, being viewed from another viewing angle.

In another embodiment, as shown in FIG. 26 to FIG. 28, the steering-wheel computer bracket further includes a bracket assembly 44. The fixed portions 1 of the two foldable support assemblies 10 are respectively arranged at two sides of a same end of the bracket assembly 44. The movable portions 2 of the two foldable support assemblies 10 are configured around horizontal shafts respectively to rotatably connected to two opposite side walls of the bracket assembly 44. The support element 3 is configured around the vertical shaft to rotatably connected to the respective movable portion 2. Further, the support element 3 may be rotated, along with rotation of the movable portion 2, to protrude out of an end of the bracket assembly 44 or to attach to a side wall of the bracket assembly 44.

In the present embodiment, the fixed portion 1 of the foldable support assembly 10 may be fixedly connected to the bracket assembly 44 by screws or the like. Alternatively, the fixed portion 1 and the bracket assembly 44 may be configured as a one-piece and integral structure. In some embodiments, the fixed portion 1 of each foldable support assemblies 10 is integrally formed with a respective one of the two support rod set 45. In this way, the movable portions 2 of the foldable support assemblies 10 may be directly attached to the opposite sides of the bracket assembly 44, and the fixed portions 1 may be omitted, such that an overall structure and appearance of the bracket assembly is simplified. In the present embodiment, the movable portions 2 of the foldable support assemblies 10 are rotationally connected to the opposite sides of the bracket assembly 44, such that the support elements 3 may be rotated, along with rotation of the movable portions 2, to the end face of the extension-retraction bracket assembly 44 or to attach to the side wall of the bracket assembly 44. In this way, while the support elements 3 is able to rotate more flexibly, the foldable support assemblies 10 may be folded, attached to, and stored in the side wall of the bracket assembly 44, and an additional slot for receiving the foldable support assemblies 10 does not need to be defined. Therefore, a manufacturing process is simplified, and the overall appearance is more aesthetically pleasing.

In detail, the bracket assembly 4 includes two support rod sets 45 opposite to each other and a foldable frame 46 connecting to the two support rod sets 45. The foldable frame 46 is extendable or foldable to allow the two support rod sets 45 to move approach to or away from each other. The movable portions 2 of the two foldable support assemblies 10 are respectively rotatably connected to two outer walls of a same end of the two support rod sets 45. The support elements 3 are rotated, along with rotation of the movable portions 2, to the outer side of the ends of the two support rod sets 45. Detailed structures of the support rod sets 45 and the foldable frame 46 may be referred to the previous embodiments and will not be specifically limited herein. The movable portions 2 of the two foldable support assemblies 10 are respectively rotatably connected to the two outer side walls of the same end of the two support rod sets 45, effectively preventing the foldable support assemblies 10 from interfering with folding and extension of the foldable frame 46, enabling the overall structure to be more reliable.

In the present embodiment, when the bracket assembly 4 is placed on the desktop, the support elements 3 are rotated, along with rotation of the movable portions 2, to the outside of the ends of the support rod sets 45 (the support elements 3 are in the unfolded state). In this case, the support elements 3 may serve as the support structure to support the bottom of the laptop computer. When the bracket assembly 4 is hung to the steering wheel, the support elements 3 are rotated, along with rotation of the movable portions 2, to the outside of the ends of the support rod sets 45 (the support elements 3 are in the unfolded state). In this case, the support elements 3 serve as hooks to be hung to the steering wheel.

The following is to be noted.

In the description of the present disclosure, it is to be understood that the terms "center", "longitudinal", "lateral", "length", "width", "thickness", "top", "bottom", "front", "rear", "left", "right", "vertical", "horizontal", "upper", "lower", "inside", "outer", "clockwise", "counterclockwise", "axial", "radial", "circumferential", and so on, indicate orientation or positional relationships based on those shown in the accompanying drawings. The indication is intended only to facilitate the description of the present disclosure and to simplify the description, and is not intended to indicate or imply that the device or element must have a particular orientation or must be constructed and operated in a particular orientation. Therefore, these terms cannot be construed as a limitation of the present disclosure.

In addition, the terms "first" and "second" are used for descriptive purposes only and are not to be understood as indicating or implying relative importance or implicitly specifying the number of technical features indicated. Therefore, a feature defined with the terms "first" and "second" may expressly or implicitly include at least one such feature. In the description of the present disclosure, "a plurality of" means at least two, such as two, three, and so on, unless otherwise expressly and specifically limited.

In the present disclosure, unless otherwise expressly provided and qualified, the terms "installation", "connection", "coupled", "fixing", and so on, shall be understood in a broad sense. The connection may be fixed connection, removable connection, or configuration as a one-piece structure, mechanical connection, electrical connection, direct connection, indirect connection through an intermediate medium, connection from an interior of two elements, or interaction between the two elements, unless otherwise expressly limited. For any ordinary skill in the art, specific meanings of the above terms in the present disclosure may be understood according to the specific circumstances.

In the present disclosure, unless otherwise expressly specified and limited, the first feature being "above" or "below" the second feature may have a direct contact between the first and second features, or an indirect contact between the first and second features through an intermediate medium. Furthermore, the first feature being "above", "on top of", "on" the second feature may be that the first feature is directly above or diagonally above the second feature, or simply that the first feature is horizontally higher than the second feature. The first feature being "below", "under", and "at a lower of" the second feature may be that the first feature is directly below or diagonally below the second feature, or simply that the first feature is less horizontal than the second feature. second feature.

In the description of the present disclosure, the terms "an embodiment", "some embodiments", "examples", "specific examples", or "some examples" mean that the specific features, structures, materials, or characteristics described in one embodiment or example are included in at least one embodiment or example of the present disclosure. In this specification, schematic expressions of the above terms need not be directed to the same embodiment or example. Moreover, the specific features, structures, materials, or characteristics described may be combined in any one or more embodiments or examples in a suitable manner. Furthermore, without contradicting each other, those skilled in the art may combine different embodiments and examples, or combine features of different embodiments and examples described in this specification Although embodiments of the present disclosure have been shown and described in the above, it is to be understood that the above embodiments are exemplary and shall not be interpreted as limiting the present disclosure. Any ordinary skill in the art may make changes, modifications, substitutions, and variations on the above embodiments within the scope of the present disclosure.

What is claimed is:

1. A steering-wheel computer bracket, comprising two foldable support assemblies, wherein each foldable support assembly comprises a fixed portion, a movable portion, and a support element; wherein an end of the movable portion is hinged to a side of the fixed portion, such that the movable portion is rotatable about a first hinge axis, an other side of the fixed portion serves as a mounting surface; an end of the support element is rotatably connected to an other end of the movable portion, such that the support element is rotatable around a first rotational axis; wherein the first rotational axis is perpendicular to the first hinge axis;

or the support element is strip-shaped, the movable portion is rotatably arranged on the side of the fixed portion, such that the movable portion is rotatable around a second rotational axis; the other side of the fixed portion serves as a mounting surface, the end of the support element is hinged to the movable portion, such that the support element is rotatable about a second hinge axis; wherein the second hinge axis is perpendicular to the second rotational axis;

when the computer bracket is hung to a steering wheel, two support elements of the two foldable support assemblies are unfolded and respectively hung to two sides of an upper edge of the steering wheel; and when the computer bracket is placed on a desktop, the support element is selectively unfolded, the support element is folded or unfolded to adjust an inclination of a laptop computer.

2. The steering-wheel computer bracket according to claim 1, further comprising a bracket assembly, wherein,
two fixing portions of the two foldable support assemblies are respectively arranged on two sides of an end of a side of the bracket assembly;
when a supporting element is flipped to be unfolded, a surface of the supporting element near the bracket assembly serves as a support surface configured to be attached to an outer edge of an upper of the steering wheel.

3. The steering-wheel computer bracket according to claim 2, wherein the support surface is a flat and straight surface; when the support element is flipped to be unfolded, an angle between the support surface and the bracket assembly is not greater than 90°; and/or
a spacing between the two foldable support assemblies is less than a diameter of the steering wheel.

4. The steering-wheel computer bracket according to claim 2, wherein each of two sides of an end of a face of the bracket assembly defines an assembling slot, the fixed portion of each of the two foldable support assemblies is fixedly received in the assembling slot respectively; the support element of each foldable support assembly is capable of being moved to be folded into the assembling slot or being unfolded to protrude out of the assembling slot to support the face of the bracket assembly.

5. The steering-wheel computer bracket according to claim 2, wherein the bracket assembly is configured to store the folded support element and to adjust a spacing between two support elements of the two foldable support assemblies; and the bracket assembly is unfolded when being in use.

6. The steering-wheel computer bracket according to claim 2, wherein the bracket assembly includes two carrier plates opposite to each other and an extension-retraction member movably connected with the two carrier plates; each carrier plate is elongated strip-shaped; the extension-retraction member is capable of being folded or unfolded in a width direction of the carrier plate to enable the two carrier plates to move to approach or far away from each other in the width direction of the carrier plate; two fixed portions of the two foldable support assemblies are respectively arranged on two sides of the two carrier plates, facing a same direction;
when the end of the movable portion is hinged to the side of the fixed portion, an extension direction of the first hinge axis of the movable portion is the same as the width direction of the carrier plate; when the support element is flipped to approach to or attach to the respective carrier plate, the support element extends along a length direction of the carrier plate;
when the end of the support element is hinged to the movable portion, and when support element is flipped to approach to or to attach to the respective carrier plate, a length direction of the support element is the same as with the length direction of the carrier plate.

7. The steering-wheel computer bracket according to claim 2, wherein the bracket assembly comprises two strip-shaped second support base plates located on a same plane, two strip-shaped second support panels, and a second shear-typed extension-retraction frame;
the two second support base plates are parallel to each other; for each second support base plate, an end is arranged with a curved portion being bent towards the other side of the second support base plate; a respective one of the two foldable support assembly is arranged to a side of the curved portion;
the two second support panels and the two second support base plates are in one-to-one correspondence with each other; for one of the two second support panels and a corresponding one of the two second support base plates, an end of the second support panel s hinged to the other side of an end of the second support base plate;
the two second support panels are flipped and folded, under an external force, onto the two second support base plates respectively, or each second support panel is flipped and folded, the external force, to have an angle with respect to a corresponding one of the two second support base plates; the two second support panels are fixed to the two second support base plates by second support members respectively;
for each second support panel and the corresponding one of the two second support base plates, a side of the other end of the second support panel away from the second support base plate is rotatably arranged with a second support portion; the second support portion is rotated and folded onto the second support panel or rotated to have an angle with respect to the second support panel;
one of the two second support panels has a first side near the other one of the two second support panels, and the other one of the two second support panels has a second side near the one of the two second support panels, two ends of the second shear-typed extension-retraction frame are connected to the first side and the second side respectively; the second shear-typed extension-retraction frame is extended and retracted under an external force to enable the two second support panels to approach to or to move away from each other.

8. The steering-wheel computer bracket according to claim 2, wherein the fixed portion of each of the two foldable support assemblies and the respective end of the bracket assembly are configured as a one-piece and integral structure.

9. The steering-wheel computer bracket according to claim 2, wherein the movable portion is hinged to the side of the fixed portion to enable the support element of each foldable support assembly to be flipped and folded onto the side of the bracket assembly, or flipped to be unfolded away from the bracket assembly to support the side of the bracket assembly; when the support element is flipped to be unfolded, a side of support element near the bracket assembly serves as the support surface to attach to the outer edge of the upper of the steering wheel; the end of the support element is rotationally connected to the other end of the movable portion to passively rotate the support element of each foldable support assembly when the support element is hung to the steering wheel, the support surface is naturally tangent with the outer edge of the steering wheel;
or
the end of the support element is hinged to the movable portion to enable the support element of each foldable support assembly to be flipped and folded onto the side of the bracket assembly or to be flipped to be unfolded away from the bracket assembly to support the side of the bracket assembly; when the support element is flipped to be unfolded, a side of the support element near the bracket assembly serves as the support surface to attach to the outer edge of the upper of the steering wheel; the movable portion is rotatably mounted on the side of the fixed portion to passively rotate the support element of the foldable support assembly when the support element is hung to the steering wheel, the support surface is naturally tangent with the outer edge of the steering wheel.

10. The steering-wheel computer bracket according to claim 9, wherein the support surface is a curved surface adapted to the outer edge of the steering wheel.

11. The steering-wheel computer bracket according to claim 9, wherein a surface of the support element is a flat and straight surface, and the other surface of the support element is a curved surface; a thickness of an end of the support element away from the movable portion is greater than a thickness of an end of the support element near the movable portion.

12. The steering-wheel computer bracket according to claim 9, wherein an end of the support element away from the movable portion is bent towards a side of the support element to form a curved hook portion, a surface of the curved hook portion and a surface of the remaining part of the support element cooperatively serve as the support surface.

13. The steering-wheel computer bracket according to claim 12, wherein the support surface comprises a flat support surface formed on the support element, an angle between the flat support surface on the support element and the support surface on the curved hook portion is an obtuse angle.

14. The steering-wheel computer bracket according to claim 12, wherein a bottom of the bracket assembly is partially recessed to form a storage slot, the curved hook portion is at least partially foldable to be stored in the storage slot.

15. The steering-wheel computer bracket according to claim 9, wherein the bracket assembly comprises a support base plate, an end of the support base plate is bent downwards to form a limiting portion; the end of the movable portion is configured around a horizontal shaft to be hinged to the bottom of the support base plate to allow the other end of the movable portion to be flipped outwardly to abut against the limiting portion, the other end of the movable portion is configured to enable the support element to be configured around a vertical shaft to be rotatably connected.

16. The steering-wheel computer bracket according to claim 9, wherein the support surface is a flat and straight surface; when the support element is flipped to be unfolded, an angle between the support surface and the bracket assembly is not greater than 90°.

17. The steering-wheel computer bracket according to claim 9, wherein the first hinge axis of the movable portion does not intersect with the first rotational axis of the support element.

18. The steering-wheel computer bracket according to claim 15, wherein the support base plate has a first abutting region, configured to contact the desktop, and a second abutting plane, configured to contact the steering wheel;
when the steering-wheel computer bracket is used by being placed on the desktop, the movable portion is flipped outwardly to abut against the limiting portion; when the supporting element is rotated to allow the support surface to face outwardly, an angle between a line connecting the first abutting region with first hinge axis of the movable portion and a line connecting first hinge axis of the movable portion with a free end of the curved hook portion is an obtuse angle;
when the steering-wheel computer bracket is used by being hung to the steering wheel, two support elements of the two foldable support assemblies are unfolded and are respectively hung to two sides of the upper edge of the steering wheel, when the support element is rotated to allow the support surface to face towards the steering wheel, an angle between a second abutting plane and the first rotational axis of the support element is an acute angle.

19. A steering-wheel computer bracket, comprising two foldable support assemblies, wherein each foldable support assembly comprises a fixed portion, a movable portion, and a support element; wherein
an end of the movable portion is hinged to a side of the fixed portion and is capable of being flipped to have an angle with respect to or to attach to the side of the fixed portion, an other side of the fixed portion serves as a mounting surface; an end of the support element is rotatably connected to an other end of the movable portion, the support element is capable of being flipped, along with the movable portion being flipped, to attach to the side of the fixed portion or to have an angle relative to the side of the fixed portion;
or
the support element is strip-shaped, the movable portion is rotatably arranged on the side of the fixed portion; the other side of the fixed portion serves as a mounting surface, the end of the support element is hinged to the movable portion;
when the computer bracket is hung to a steering wheel, two support elements of the two foldable support assemblies are unfolded and respectively hung to two sides of an upper edge of the steering wheel; and when the computer bracket is placed on a desktop, the support element is selectively unfolded, the support element is folded or unfolded to adjust an inclination of a laptop computer;
wherein the steering-wheel computer bracket further comprises a bracket assembly, wherein two fixing portions of the two foldable support assemblies are respectively arranged on two sides of an end of the bracket assembly; two movable portions of the two foldable support assemblies are configured around horizontal shafts respectively to be rotatably connected to the opposite side walls of the bracket assembly, respectively; two support elements are configured around vertical shafts respectively to be rotatably connected to the two movable portions respectively; the two support elements are rotated, along with rotation of the two movable portions, to protrude out of an end face of the bracket assembly or to attach to the side wall of the bracket assembly.

20. The steering-wheel computer bracket according to claim 1, wherein, when the steering-wheel computer bracket is placed on the desktop, a bottom end of the support element extends along a plane on which the desktop is arranged to enable the support element to take a line or a plane to contact the desktop.

* * * * *